US012387147B2

(12) United States Patent
Garg et al.

(10) Patent No.: US 12,387,147 B2
(45) Date of Patent: Aug. 12, 2025

(54) UNIFIED REPRESENTATION LEARNING OF MEDIA FEATURES FOR DIVERSE TASKS

(71) Applicant: Gracenote, Inc., Emeryville, CA (US)

(72) Inventors: Amanmeet Garg, Santa Clara, CA (US); Gannon Gesiriech, Carlsbad, CA (US)

(73) Assignee: Gracenote, Inc., New York, NY (US)

( * ) Notice: Subject to any disclaimer, the term of this patent is extended or adjusted under 35 U.S.C. 154(b) by 868 days.

(21) Appl. No.: 17/502,347

(22) Filed: Oct. 15, 2021

(65) Prior Publication Data

US 2023/0123577 A1  Apr. 20, 2023

(51) Int. Cl.
*G06N 20/20* (2019.01)
*G06F 18/214* (2023.01)
*G06V 10/774* (2022.01)
*G06V 10/778* (2022.01)
*G06V 20/40* (2022.01)

(52) U.S. Cl.
CPC ........... *G06N 20/20* (2019.01); *G06F 18/214* (2023.01); *G06V 10/774* (2022.01); *G06V 10/778* (2022.01); *G06V 20/46* (2022.01)

(58) Field of Classification Search
None
See application file for complete search history.

(56) References Cited

U.S. PATENT DOCUMENTS

| 11,138,409 | B1* | 10/2021 | Krueger | G06V 10/82 |
| 2021/0342643 | A1* | 11/2021 | Bai | G06F 18/2148 |
| 2023/0050573 | A1* | 2/2023 | Liu | G06V 10/7715 |

* cited by examiner

*Primary Examiner* — Leon Flores
(74) *Attorney, Agent, or Firm* — McDonnell Boehnen Hulbert & Berghoff LLP

(57) ABSTRACT

Methods and systems are disclosed for generating general feature vectors (GFVs), each simultaneously constructed for separate tasks of image reconstruction and fingerprint-based image discrimination. The computing system may include machine-learning-based components configured for extracting GFVs from images, signal processing for both transmission and reception and recovery of the extracted GFVs, generating reconstructed images from the recovered GFVs, and discriminating between fingerprints generated from the recovered GFVs and query fingerprints generated from query GFVs. A set of training images may be received at the computing system. In each of one or more training iterations over the set of training images, the components may be jointly trained with each training image of the set by minimizing a joint loss function computed as a sum of losses due to signal processing and recovery, image reconstruction, and fingerprint discrimination. The trained components may be configured for runtime implementation among one or more computing devices.

20 Claims, 9 Drawing Sheets

UNIFIED REPRESENTATION LEARNING OF MEDIA FEATURES FOR DIVERSE TASKS

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method for representation learning of image features carried out by a computing system is disclosed. The computing system may include computational implementations of a machine-learning-based (ML-based) extraction model (MLEM), a signal conditioner model (SCM), a signal recovery model (SRM), a ML-based reconstruction model (MLRM), a ML-based reference fingerprint generation model (RFPGM), and a ML-based query fingerprint generation model (QFPGM). The method may include: receiving a set of training images at the computing system; within each of one or more iteration epochs, carrying out a respective training iteration over the set of training images, wherein each training iteration comprises training operations carried out for each respective training image of the set, the training operations comprising: (i) applying the MLEM to the respective training image to extract a respective training general feature vector (GFV), (ii) applying the SCM followed in series by SRM to the respective training GFV to convert it to a respective recovered training GFV, and computing a respective rate loss associated with the conversion, (iii) applying the MLRM to the respective recovered training GFV to generate a respective recovered training image, (iv) applying the RFPGM to the respective recovered training GFV to generate a respective training reference fingerprint, (v) applying the QFPGM to one or more of a plurality of training query-GFVs to generate one or more corresponding respective training query fingerprints, wherein each respective training query-GFV is one of: expected similarity to the respective training GFV, or expected dissimilarity to the respective training GFV, (vi) computing a respective image loss by comparing the respective recovered training image with the respective training image, and computing a respective discrimination loss by comparing the respective training reference fingerprint with the one or more corresponding respective training query fingerprints, (vii) computing a respective joint loss function as a sum of the respective image loss, the respective rate loss, and the respective discrimination loss, and (viii) simultaneously training the MLEM, the SCM, the SRM, the MLRM, the RFPGM, and the QFPGM subject to minimizing the respective joint loss function; and configuring the trained MLRM, the trained SCM, the trained SRM, the trained MLRM, the trained RFPGM, and the trained QFPGM for runtime implementation among one or more computing devices.

In another aspect, a method for generating general feature vectors (GFVs) that are each simultaneously constructed for separate tasks of both image reconstruction and fingerprint-based image discrimination is disclosed. The method may be implemented by a computing system, and may include: receiving a set of training images at the computing system, wherein the computing system comprises machine-learning-based (ML-based) components that are respectively configured for: extracting GFVs from images, signal processing for both transmission and subsequent reception and recovery of the extracted GFVs, generating reconstructed images from the recovered GFVs, and discriminating between fingerprints generated from the recovered GFVs and query fingerprints generated from query GFVs; in each of one or more training iterations over the set of training images, jointly training the components of the system with each training image of the set, by minimizing a joint loss function computed as a sum of losses due to signal processing and recovery, image reconstruction, and fingerprint discrimination; and configuring the trained components for runtime implementation among one or more computing devices.

In still another aspect, a method for representation learning of audio features carried out by a computing system is disclosed. The computing system may include computational implementations of a machine-learning-based (ML-based) extraction model (MLEM), a signal conditioner model (SCM), a signal recovery model (SRM), a ML-based reconstruction model (MLRM), a ML-based reference fingerprint generation model (RFPGM), and a ML-based query fingerprint generation model (QFPGM). The method may include: receiving a set of training audio spectrograms at the computing system; within each of one or more iteration epochs, carrying out a respective training iteration over the set of training audio spectrograms, wherein each training iteration comprises training operations carried out for each respective training audio spectrogram of the set, the training operations comprising: (i) applying the MLEM to the respective training audio spectrogram to extract a respective training general feature vector (GVF), (ii) applying the SCM followed in series by SRM to the respective training GFV to convert it to a respective recovered training GFV, and computing a respective rate loss associated with the conversion, (iii) applying the MLRM to the respective recovered training GFV to generate a respective recovered training audio spectrogram, (iv) applying the RFPGM to the respective recovered training GFV to generate a respective training reference fingerprint, (v) applying the QFPGM to one or more of a plurality of training query-GFVs to generate one or more corresponding respective training query fingerprints, wherein each respective training query-GFV is one of: expected similarity to the respective training GFV, or expected dissimilarity to the respective training GFV, (vi) computing a respective audio-spectrogram loss by comparing the respective recovered training audio spectrogram with the respective training audio spectrogram, and computing a respective discrimination loss by comparing the respective training reference fingerprint with the one or more corresponding respective training query fingerprints, (vii) computing a respective joint loss function as a sum of the respective audio-spectrogram loss, the respective rate loss, and the respective discrimination loss, and (viii) simultaneously training the MLEM, the SCM, the SRM, the MLRM, the RFPGM, and the QFPGM subject to minimizing the respective joint loss function; and configuring the trained MLRM, the trained SCM, the trained SRM, the trained MLRM, the trained RFPGM, and the trained QFPGM for runtime implementation among one or more computing devices.

In yet another aspect, a system for representation learning of image features is disclosed. The system may include one or more processors, and memory storing instructions that, when executed by the one or more processors, cause the system to carry out various operations. The operations may include: implementing a machine-learning (ML)-based extraction model (MLEM), a signal conditioner model (SCM), a signal recovery model (SRM), a ML-based reconstruction model (MLRM), a ML-based reference fingerprint generation model (RFPGM), and a ML-based query fingerprint generation model (QFPGM); receiving a set of training images at the computing system; within each of one or more iteration epochs, carrying out a respective training iteration over the set of training images, wherein each training iteration comprises training operations carried out for each respective training image of the set, the training operations comprising: (i) applying the MLEM to the respective training image to extract a respective training general feature vector (GVF), (ii) applying the SCM followed in series by SRM to the respective training GFV to convert it to a respective recovered training GFV, and computing a respective rate loss associated with the conversion, (iii) applying the MLRM to the respective recovered training GFV to generate a respective recovered training image, (iv) applying the RFPGM to the respective recovered training GFV to generate a respective training reference fingerprint, (v) applying the QFPGM to one or more of a plurality of training query-GFVs to generate one or more corresponding respective training query fingerprints, wherein each respective training query-GFV is one of: expected similarity to the respective training GFV, or expected dissimilarity to the respective training GFV, (vi) computing a respective image loss by comparing the respective recovered training image with the respective training image, and computing a respective discrimination loss by comparing the respective training reference fingerprint with the one or more corresponding respective training query fingerprints, (vii) computing a respective joint loss function as a sum of the respective image loss, the respective rate loss, and the respective discrimination loss, and (viii) simultaneously training the MLEM, the SCM, the SRM, the MLRM, the RFPGM, and the QFPGM subject to minimizing the respective joint loss function; and configuring the trained MLRM, the trained SCM, the trained SRM, the trained MLRM, the trained RFPGM, and the trained QFPGM for runtime implementation among one or more computing devices.

DETAILED DESCRIPTION

I. Overview

Figure 1:
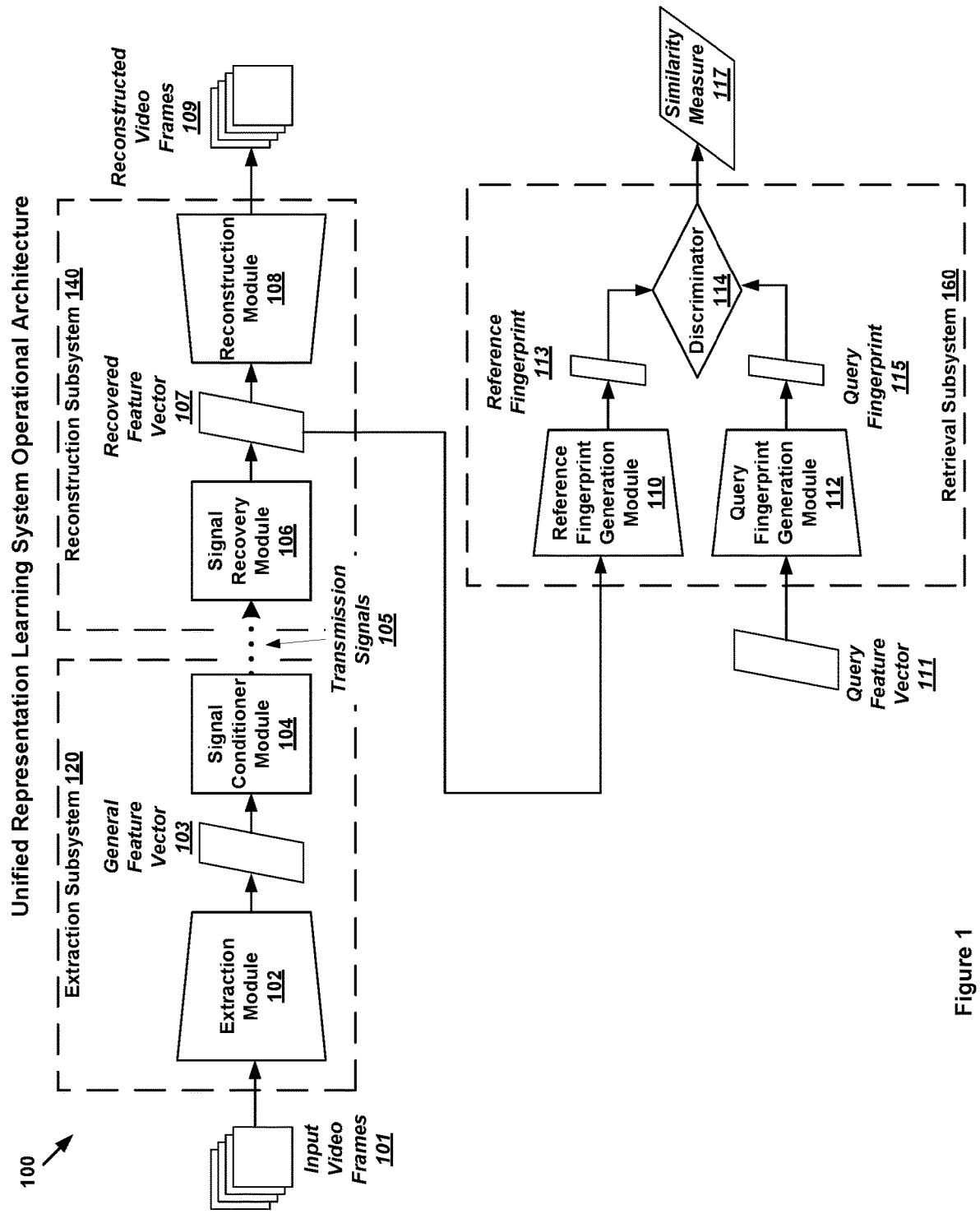
FIG. 1 is a simplified operational block diagram of a unified representation learning system in which various disclosed principles can be implemented.

Content providers may provide various forms of online streaming, broadcast, and/or downloadable media content to end users, including video media, music and other audio media, and other possible forms of media content, for example. A content provider may be a direct source of content for end users, or may provide content to one or more content distribution services, such as broadcasters, which then deliver selected content to end users. An example of a content provider could be a media content company that provides media content to media distribution services, which then deliver media content to end users. End users may subscribe at a cost to one or more media distribution services or directly to one or more media content companies for content delivery, and/or may receive at least some content at no charge, such as from over-the-air broadcasters or from public internet websites that host at least some free content for delivery to end users. Media content may be delivered to end users as broadcast or streaming content for immediate playout and/or may be downloaded media files that may be locally stored on user devices for playout at any time, for example.

Content providers and/or media distribution services may be interested in being able to carry out various forms of real time and/or historical analysis, assessment, or evaluation of media content that they are delivering or have delivered to individual user devices, groups of user devices, and other consumers of delivered content. Such analyses, assessments, or evaluations may serve a variety of goals or needs. For example, real time and/or historical information about what television (TV) programs individual viewers or groups of viewers are watching or have watched may be useful for viewer ratings studies. As another example, identification of particular TV programs or movies that have been broadcast or streamed in a given viewing market during a specified time range may be useful in various marketing analyses. As still another example, identification of specific personalities or visual scenes that have been broadcast or streamed on particular dates may be useful in advertising campaigns. And as even a further example, the ability to reconstruct images in individual video frames of TV programs or movies based on such selection criteria as dates, times, and/or viewer markets of broadcast or streaming may also be useful for electronic program scheduling promotions. These are just a few examples. Their application to video programming should not be viewed as limiting; similar or corresponding considerations may be given to audio programming and/or web-based media content.

To facilitate historical and/or real time analyses and/or evaluation of broadcast and/or streamed content, media content data, such as video frames, may be transformed to one or more representational forms that support one or more corresponding types of analytical task. For example video frames having one million or more pixels may be processed into much lower dimensional feature vectors that can later be reconstructed into images having high fidelity to the original video frame. Video frames may also be processed into "fingerprints" that, while even more compact than feature vectors suited for image reconstruction, can nevertheless be used to accurately match and/or discriminate between the source video frames.

In practice, a content distribution service provider may maintain one or more archives of feature vectors, and/or other archives of fingerprints. The sources of media content for these archives could be content feeds received by distribution service providers from content providers, such as movie production companies, TV networks, and sporting event producers, for example. The sources could also be client devices, such as smart TVs or set top boxes of individual subscribers.

Conventional techniques for generating representational forms of media data are designed for specific tasks. Thus, for example, conventional techniques for feature extraction of video frames yield feature vectors specialized for either image reconstruction or fingerprint generation and discrimination. As such, conventional technique are lacking in a number of ways. One deficiency relates to the inability to update historical archives of fingerprints as new techniques for fingerprint generation emerge in response to new applications and/or new technologies. Instead, entire archives may need to be recreated. Another deficiency relates to redundancies incurred from have to create task-specific representations of media data. These redundancies may be multiplied when new applications and technologies for generation emerge. For these and other reasons, conventional techniques can be inefficient and inflexible.

The inventors have recognized these shortfalls of conventional techniques, and devised approaches that instead incorporate versatility and flexibility into both the generation of form of general feature vectors that support multiple, diverse tasks in a unified manner, and the systems that may be configured and trained to generate the general feature vectors. More specifically, the inventors have devised techniques for joint training of diverse tasks of a unified representation learning system.

While the techniques and embodiments disclosed herein are described by way of example in terms of video frame sequences, such as broadcast and/or streaming video, the techniques may be extended to other forms of frame-based or sequence-based media, such as audio media, which could take the form of 2-dimensional (2D) audio spectrograms, for example.

II. Architecture

A. Example System for Automated Video Segmentation

FIG. 1 is a simplified operational block diagram of unified representation learning system 100 that may be configured to carry out various tasks and operations described herein. The block diagram of FIG. 1 may also be considered as depicting an operational architecture of the system 100. The terms "unified representation learning," "unified representation learning of image features," or the like are used to describe representation learning enhanced in a manner that enables diverse tasks be carried out using general feature vectors. In accordance with example embodiments, general feature vectors, or "GFVs," may be generated or extracted from images using a machine-learning (ML) system trained to simultaneously accomplish a specified diverse set of tasks. Advantageously, GFVs may thereby encompass diverse feature representations of images in a unified form that can then be applied to the diverse tasks on which the system was trained. While example embodiments herein are described in terms of GFVs derived from images, such as video frames, the disclosed techniques and systems may be extended, adapted, and/or generalized to apply to other forms of media and non-media data as well. As such, the example embodiments should not be viewed as limiting with respect to the applicability of the disclosed techniques, methods, and/or systems.

The unified representation learning system 100 can include various components, any one or more of which may be implemented as or in one or more computing devices. As such, components of the unified representation learning system 100 may themselves be or include hardware, software, firmware, or combinations thereof. Some of the components of the unified representation learning system 100 may be identified structurally, such as databases or other forms of data storage and management, and others are identified in terms of their operation or function. Operational and/or functional components could be implemented as software and/or hardware modules, for example, and will sometimes be referred to herein as "modules" for the purpose of the present discussion.

Non-limiting example components of the unified representation learning system 100 include an extraction module 102, a signal conditioner module 104, a signal recovery module 106, a reconstruction module 108, a reference fingerprint generation module 110, a query fingerprint generation module 112, and a discriminator module 114. In the example operational architecture, the extraction module 102 and signal conditioner module 104 are configured in an extraction subsystem 120, the signal recovery module 106 and reconstruction module 108 are configured in a reconstruction subsystem 140, and the reference fingerprint generation module 110, query fingerprint generation module 112, and discriminator module 114 are configured in a retrieval subsystem 160. In addition, FIG. 1 depicts a number of data elements or constructs that are generated by and/or passed between system components, as well as data that are input to and output by the system. These are described below in the context of example operation.

In accordance with example embodiments, the extraction module 102, reconstruction module 108, the reference fingerprint generation module 110, and query fingerprint generation module 112 may each be implemented with respective artificial neural networks (ANNs) or other ML-based models. The signal conditioner module 104 and signal recovery module may similarly be implemented as ML-based models. As such, each of these modules may be trained during training operations, as described below.

The unified representation learning system 100 can also include one or more connection mechanisms that connect various components within the system 100. By way of example, the connection mechanisms are depicted as arrows between components. The direction of an arrow may indicate a direction of information flow, though this interpretation should not be viewed as limiting. In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. A connection mechanism may also include programmed communication between software and/or hardware modules or applications, such as application program interfaces (APIs), for example. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

Generally, the unified representation learning system 100, may operate in two modes: training mode and runtime mode. In training mode, the ML-based components of the unified representation learning system 100 may be concurrently "trained" to simultaneously accomplish distinct tasks or operations of image feature extraction, signal processing and recovery, image reconstruction, and generation of fingerprint for comparison and discrimination. The training process also entails training the system to generate GFVs that can unify in one feature vector support feature extraction/image reconstruction, and fingerprint generation/discrimination operations. During training, parameters of the ML-based model components (e.g., the ANNs) are adjusted by applying one or another technique for updating ML-based learning models. Non-limiting examples include known techniques such as back-propagation techniques. However, other techniques may be used as well. In runtime mode, the unified representation learning system 100 may operate to generate GFVs and to carry out the tasks and operations as trained.

General operation of the unified representation learning system 100 may be understood by considering an example of processing of video frames as input. While the following description illustrates application to video/image data, it should be understood that the unified representation learning system 100 could be adapted for training and runtime operation applied to audio data, such as 2D audio spectrograms, as well.

As shown, input video frames 101 may be received by the extraction module 102, which extracts features and generates respective, corresponding GFVs, represented in FIG. 1 by just a single particular GFV 103. (For application to audio data, the input audio spectrograms, or input audio frames, may be used in place of the input video frames 101, for example.) The GFV 103 is next input to the signal conditioner module 104, which converts the input to transmission signals 105 that are next input to the signal recovery module 106, which, in turn, converts the transmission signals 105 into a recovered GFV 107. In example embodiments, the signal conditioner module may perform data compression, and the signal recovery module may perform complementary data decompression. The transmission signals may thus carry a signal-processed form of the input GFV 103, such as a compressed version in a bit stream. In practice, the transmission signals may be transmitted using one or more of various transmission technologies. Non-limiting examples of transmission technologies include wired and/or wireless transmission (e.g., WiFi, broadband cellular, wired Ethernet, etc.) over one or more type communication networks (wide area networks, local networks, public internets, etc.), as well as possibly direct interface connections between collocated computing devices, and/or program interfaces between program components executing on an individual computing system.

The recovered GFV 107 may then be input to either or both of the reconstruction module 108, or the reference fingerprint generation module 110. The reconstruction module 108 may operate to reconstruct the particular input video frame, represented by reconstructed video frames 109. The reference fingerprint generation module 110 may operate to generate a reference fingerprint 113 from the recovered GFV 107, which may then be compared against a query fingerprint 115 generated from a query feature vector 111 by the query fingerprint generation module 112. The comparison of the reference fingerprint 113 and the query fingerprint 115 may be carried out by the discriminator 114, which outputs the result as a similarity measure 117 in the example of FIG. 1. The similarity measure 117 may correspond to a range of values or degrees of similarity between the reference fingerprint 113 and the query fingerprint 115, or a binary indication of whether the reference fingerprint 113 matches the query fingerprint 115. In either case, the similarity measure may include an associated statistical confidence level. In example embodiments, the discriminator 114 may use a distance measure or a vector inner product to compute the similarity measure 117. Other formulations are possible as well. The operations involving reference and query fingerprint generation and fingerprint discrimination are referred to herein collectively as "retrieval" tasks or operations.

While image reconstruction and retrieval are depicted as parallel operations and described as being carried out for the same recovered GFV 107, example embodiments of a unified representation learning system may support a variety of practical applications and usage scenarios that do not necessarily involve both reconstruction and retrieval in the same task undertaking. For example, in one usage scenario, the system may be used to populate a database of reference GFVs corresponding to video frames of one or more content programs (e.g., movies or TV shows). Although not explicitly shown in FIG. 1, the input video frames 101 may include or be accompanied by metadata relating to the media content and including such information as title, genre, and broadcast date/time, as well as frame-specific information, such as timestamps and sequencing data. This information may be stored with the reference GFVs in the database, and subsequently used as selection criteria in one or more query operations. Correspondingly, a query operation may be invoked independently of GFV-generation operations used to create and/or populate a reference GFV database.

In example operation, there may be various sources of the query feature vector 111. This too reflects the variety of practical applications and usage scenarios that may be supported by the unified representation learning system 100. As one example, one or more query feature vectors may correspond to one or more individual queries for images or video frames that match previously broadcast or streamed video frames that have been historically recorded in the form of their corresponding reference GFVs in a reference GFV database. In this scenario, a user or a program may generate a query GFV from an image, and input the query GFV to the query fingerprint generation module 112, possibly together with selection criteria, such as a date/time range. The selection criteria may then be used to retrieve all or some of the reference GFVs that meet the criteria from the database. The retrieved reference GFVs may then be processed into corresponding reference fingerprints by the reference fingerprint generation module 110, which may then be stored in a reference fingerprint gallery database (not explicitly shown in FIG. 1). A query fingerprint 113 generated from the query GFV may then be compared against the reference GFVs in the gallery by the discriminator 114, and the result reported in a display or results file, for example.

As another example, the source of one or more query GFVs may be an extraction module 120 implemented on a client device, such as a smart TV or set-top box. In this scenario, the client device may be configured, e.g., with viewer consent, to report viewing statistics in the form of viewed video frames. The video frames may be mapped to corresponding GFVs and transmitted to a reconstruction subsystem 140 implemented in a content distribution provider's network, for example. The reconstruction subsystem 140 may generate recovered GFVs 107 and input one or more of them as query GFVs to the retrieval subsystem 160, which may then generate one or more corresponding query fingerprints for comparison with fingerprints in a reference fingerprint gallery database.

In accordance with example embodiments, the modules within the extraction subsystem 120 may typically be considered client-side modules, and be implemented in a computing device or system configured for client-side operations. Correspondingly the modules within the reconstruction subsystem 140 and the retrieval subsystem 160 may typically be considered server-side modules, and be implemented in a computing device or system configured for server-side operations. With this arrangement, the transmission signals between the signal conditioner module 104 and the signal recovery module may be carried on a communicative connection between client-side operations and server-side operations.

In practice, client-side implementations may be hosted in a variety of computing devices or systems, including, but not limited to, user client devices, such as smart TVs and/or set top boxes, and content-distribution networks of content service providers. Correspondingly, server-side implementations may also be hosted in a variety of computing devices or systems, including, but not limited to, operations servers of content service providers. As such, a logical separation between a client-side implementation and a server-side implementation may not necessarily always correspond to the type of physical separation that requires signal conditioning and signal recovery for physical transmission. However, in order to support implementations in which the client side and server side are physically separated and do require signal conditioning and signal recovery for signal transmission, the signal conditioner module 104 and signal recovery module 106 are included even in implementations that do not strictly require them for signal transmission. This is because, as discussed below, training the system involves jointly training the components of the extraction subsystem 120, the reconstruction subsystem 140, and the retrieval subsystem 160. Thus, the signal conditioner module 104 and the signal recovery module 106 may need to be trained in order to support a wide range of implementations.

The above are just a few non-limiting examples of usage scenarios of a unified representation learning system. Other scenarios are possible as well, and may involve real time analysis, historical analysis, and/or a mix of real time and historical analyses. Further details of an example deployment architecture for various usage scenarios are described in more detail below. Also described below are further details of an example training architecture and operations and an example client/server implementation architecture. The descriptions below are illustrated by way of example in terms of image data in the form of 2D images, such as video frames. Again, the techniques, methods, and systems described could be extended or adapted to other types of data, such audio data, in form of 2D audio spectrograms and/or audio frames, for example.

As noted, a unified representation learning system 100 and/or components thereof can take the form of, be part of, or include or encompass, a computing system or computing device. Before describing example operation of a unified representation learning system 100, an example of a computing system or device is first described.

B. Example Computing System

Figure 2:
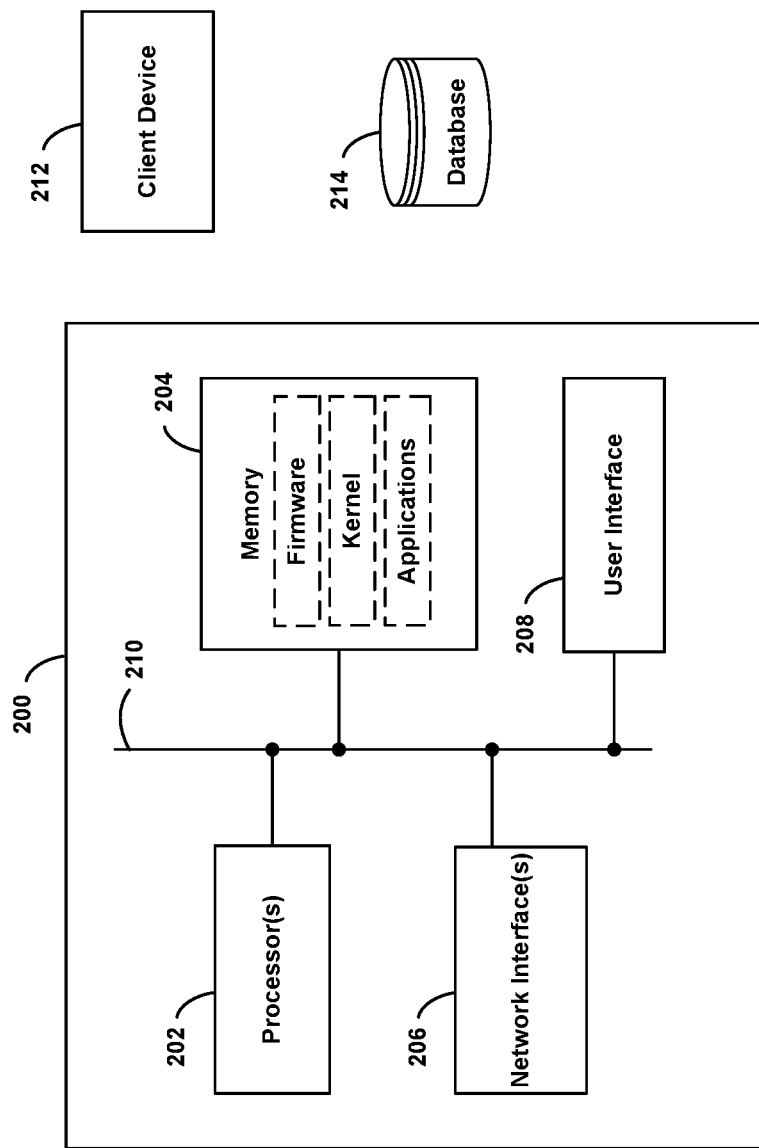
FIG. 2 is a simplified block diagram of an example computing system in which various disclosed principles can be implemented.

FIG. 2 is a simplified block diagram of an example computing system (or computing device) 200. The computing system 200 can be configured to perform and/or can perform one or more acts, such as the acts described in this disclosure. As shown, the computing device 200 may include processor(s) 202, memory 204, network interface(s) 206, and an input/output unit 208. By way of example, the components are communicatively connected by a bus 210. The bus could also provide power from a power supply (not shown).

Processors 202 may include one or more general purpose processors and/or one or more special purpose processors (e.g., digital signal processors (DSPs) or graphics processing units (GPUs). Processors 202 may be configured to execute computer-readable instructions that are contained in memory 204 and/or other instructions as described herein.

Memory 204 may include firmware, a kernel, and applications, among other forms and functions of memory. As described, the memory 204 may store machine-language instructions, such as programming code, which may be executed by the processor 202 in order to carry out operations that implement the methods, scenarios, and techniques as described herein. In some examples, memory 204 may be implemented using a single physical device (e.g., one magnetic or disc storage unit), while in other examples, memory 204 may be implemented using two or more physical devices. Memory may include transitory (volatile) and/or non-transitory (non-volatile) computer-readable storage media. In some examples, memory 204 may include storage for one or more machine learning systems and/or one or more machine learning models as described herein.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. In one example, the communication interface 206 can be a wired interface, such as an Ethernet interface. In another example, the communication interface 206 can be a wireless interface, such as a cellular or Wi-Fi interface.

The user interface 208 can allow for interaction between the computing system 200 and a user of the computing system 200, if applicable. As such, the user interface 208 can include, or provide an interface connection to, input components such as a keyboard, a mouse, a touch-sensitive panel, and/or a microphone, and/or output components such as a display device (which, for example, can be combined with a touch-sensitive panel), and/or a sound speaker. In an example embodiment, the client device 212 may provide user interface functionalities.

The computing system 200 can also include one or more connection mechanisms that connect various components within the computing system 200. For example, the computing system 200 can include a connection mechanism 210 that connects components of the computing system 200, as shown in FIG. 2.

Network interface(s) 206 may provide network connectivity to the computing system 200, such as to the internet or other public and/or private networks. Networks may be used to connect the computing system 200 with one or more other computing devices, such as servers or other computing systems. In an example embodiment, multiple computing systems could be communicatively connected, and example methods could be implemented in a distributed fashion.

Client device 212 may be a user client or terminal that includes an interactive display, such as a GUI. Client device 212 may be used for user access to programs, applications, and data of the computing device 200. For example, a GUI could be used for graphical interaction with programs and applications described herein. In some configurations, the client device 212 may itself be a computing device; in other configurations, the computing device 200 may incorporate, or be configured to operate as, a client device.

Database 214 may include storage for input and/or output data, such pre-recorded media content, such as video content that may be downloaded, broadcast, or streamed, for example. Other examples of database content may include reference GFVs and/or reference fingerprints, as mentioned above, and described in more detail below.

In some configurations, the computing system 200 can include one or more of the above-described components and can be arranged in various ways. For example, the computer system 200 can be configured as a server and/or a client (or perhaps a cluster of servers and/or a cluster of clients) operating in one or more server-client type arrangements, for instance.

III. Example Operations, Implementations, and Deployments

A. Example Training Operations

Figure 3:
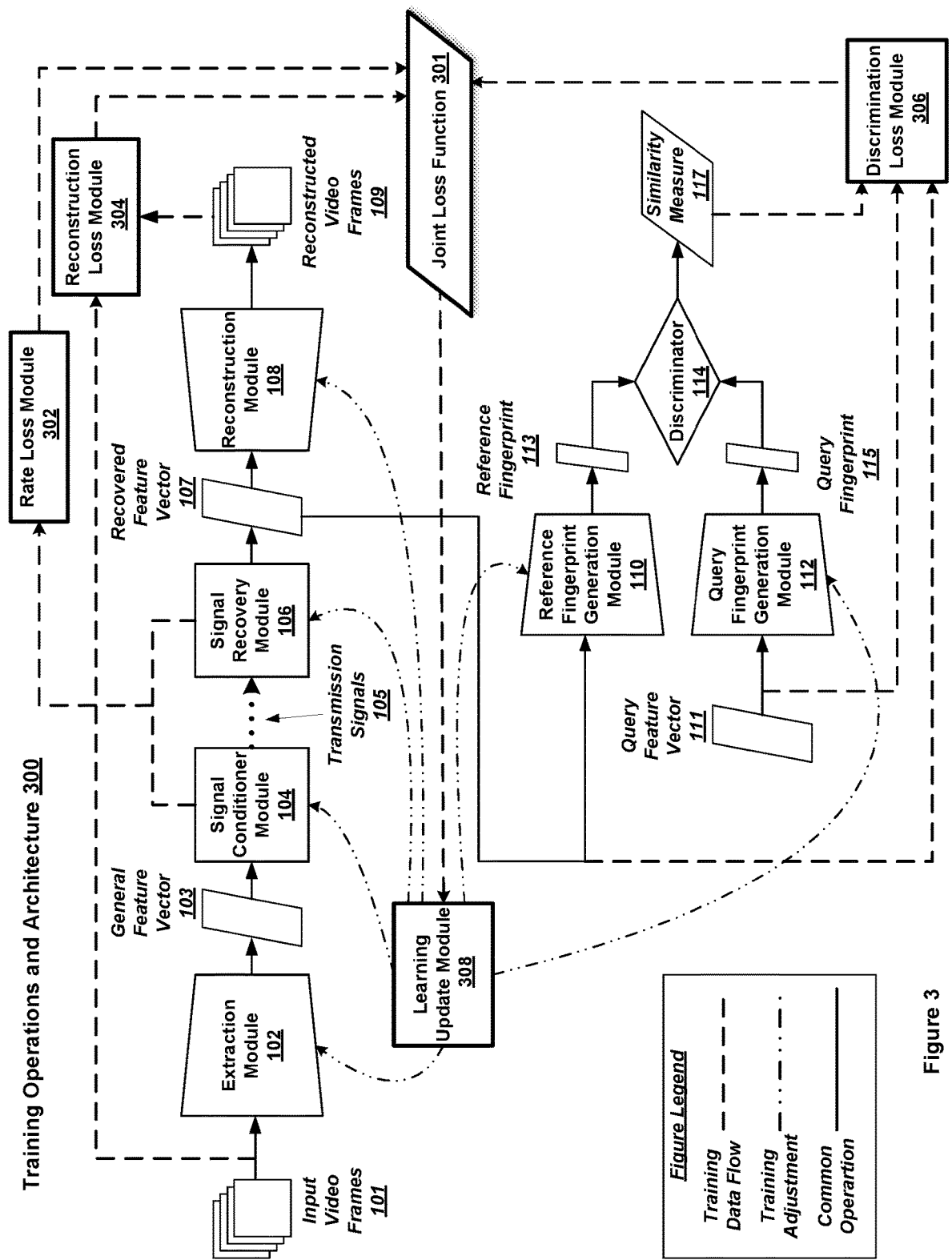
FIG. 3 illustrates example training operations a unified representation learning system, in accordance with example embodiments.

FIG. 3 illustrates example training operations and architecture 300 of an example unified representation learning system, in accordance with example embodiments. The system elements and components are the same as those shown in FIG. 1, except for the addition of a rate loss module 302, a reconstruction loss module 304, a discrimination loss module 306, a joint loss function 301, and a learning update module 308. For the sake of brevity in the figure, the architectural designations of the extraction subsystem 120, the reconstruction subsystem 140, and the retrieval subsystem 160 have been omitted. In order to visually distinguish between common operations (those of both training and runtime), training data flow, and training adjustments, different line styles are used for all three, as indicated in the figure legend.

In some examples, a unified representation learning system may be trained on a single computing system that implements both client-side configuration and the server-side configuration. This facilitates training of the signal conditioner module 104 and the signal recovery module 106 regardless the transmission technology used between them in an actual deployment of the trained system.

In accordance with example embodiments, training may involve one or more iterations over an input set of training images, such as a sequence of video frames (e.g., all or part of a movie or TV show). Each iteration may be designated as an "iteration epoch," and may include a set of intra-iteration training operations carried out on each training image of the input set. For each training image, the set of intra-iteration training operations evaluates system performance and predictions, and responsively updates system parameters. For a given iteration epoch, the collective updates of the intra-iterations over the set of training images may then be used to initialize the system for a subsequent iteration epoch. The number of iteration epochs invoked may be determined according to one or more quality or performance thresholds, for example. Additional and/or alternative factors may also be used in determining when training is deemed to meet some specified training criteria.

In further accordance with example embodiments, for each set of intra-iteration operations carried out on a training image, the modules that perform feature extraction and reconstruction, signal conditioning and recovery, and fingerprint generation and discrimination are jointly trained. As such, training may be described in terms joint training of three training components. In the process of joint training, the system is also trained to generate GFVs capable of supporting both image reconstruction and fingerprint discrimination in a unified manner.

In accordance with example embodiments, joint training entails computing a joint loss function from separately computed loss functions for each training component, and adjusting parameters of the ML-based models of each component through a learning update procedure. A non-limiting example of a learning update procedure is back propagation of the joint loss function. More generally, the learning update may involve minimizing the joint loss subject to specified constraints.

The training operations illustrated in FIG. 3 may be understood by considering one set of intra-iteration operations carried out on just one training image. The system operations described in connection with FIG. 1 and shown in FIG. 3 in solid lines (designate "common operation" in the figure legend) provide a context for the training operations of one intra-iteration set. As shown, the training image that is input to the extraction module 102 is also provided to the reconstruction loss module 304, where it serves as a ground-truth for a corresponding reconstructed image generated by the reconstruction module 108. The reconstruction loss module generates a reconstruction loss by comparing the input training image with the reconstructed image, and provides the reconstruction loss to the joint loss function 301, as shown. The reconstruction loss corresponds to loss associated with the first training component, namely feature extraction and reconstruction. In example embodiments involving audio data, reconstruction loss may be determined by comparing an input training audio spectrogram with the reconstructed audio spectrogram, for example.

As part of the same set of intra-iteration operations, signal-processing data from both the signal conditioner module 104 and the signal recovery module 106 are provided to the rate loss module 302, which computes a rate loss for the computational translation from the GFV 103 into the transmission signals 105 and back to the recovered GFV 107. This may involve quantitative comparison of the GFV 103 with the recovered GFV 107, as well as information represented in the signal conditioning and recover algorithms. Non-limiting examples of such information may include compression ratios and/or data loss measures for lossy compression algorithms. As shown, the computed rate loss is also provided to the joint loss function 301. The rate loss corresponds to loss associated with the second training component, namely signal conditioning and recovery.

The third training component, fingerprint generation and discrimination, may also be carried out as part of the same set of intra-iteration operations. In accordance with example embodiments, the reference fingerprint generation module 110 may generate a reference fingerprint 113 from the recovered GFV 107, as described in connection with FIG. 1. For training, one or more query fingerprints 115 may be generated by the query fingerprint generation module 112 from one or more corresponding query GFVs 111 that have been previously stored in a training database or recorded in memory, for example. The reference fingerprint 113 may be compared with each of the one or more query fingerprints 115, and for each comparison a similarity measure 117 may be determined by the discriminator 114. For each comparison, the similarity measure 117, the recovered GFV 107, and the query GFV 111 may all be input to the discrimination loss module 306, which may then evaluate the accuracy of the similarity measure using an "expected" similarity between the recovered GFV 107 and the query GFV 111, which may serve as an "effective" ground truth.

The "expected" similarity measure may be considered an "effective" ground truth in the sense that the query GFVs 111 may be constructed from the input set of training images prior to the current iteration epoch. In this way, the query GFVs 111 may include by design a GFV known to have been generated from a training image that will also be the source of one of the recovered GVFs applied in training. As such, the reference fingerprint 113 generated from the recovered GVF 107 will be expected to be a close match to the query fingerprint 115 generated from at least one of the query GFVs.

Additionally or alternatively, the similarity measure 117 can be used in a converse manner to evaluate an "expected" dissimilarity between the reference fingerprint 113 generated from the recovered GVF 107 and the query fingerprints 115 generated from the same constructed query GFVs 111. In this case, the reference fingerprint 113 generated from the recovered GVF 107 may be expected to be dissimilar to query fingerprints 115 generated from those query GFVs 111 generated from input training images known to be different from the one that is the source of the recovered GVF 107.

The intra-iteration training operations of fingerprint generation and discrimination for each given input training image may thus involve comparison of the recovered GVF 107 generated from the given input training image with one or more of the pre-constructed query GFVs 111. The intra-iteration training operations may further involve simultaneous evaluation of one instance of expected similarity subject to multiple instances of expected dissimilarity. Other formulations of evaluation of training for the complementary capabilities of discrimination and matching may be possible as well.

For each input training image, the discrimination loss module 306 may use the recovered GFV 107, the one or more query GFVs 111, and the one or more corresponding similarity measures to make one or more determinations of predicted similarity compared with expected similarity, and/or one or more determinations of predicted dissimilarity compared with expected dissimilarity. These determinations may then be used to compute a discrimination loss associated with the input training image. The input loss may then be provided to the joint loss function 301, as shown. It should be noted that other possible operational configurations may be used for the third training component. For example, the reference fingerprint 113 and the one or more query fingerprints 115 could be provided to the discrimination loss module 306 in addition to or instead of the recovered GFV 107 and the one or more query GFVs 111.

For each input training image, the joint loss function 301 is input to the learning update module, which then jointly adjusts to ML-based components of the system. As noted this adjustment could use a back propagation technique involving minimizing the joint loss function. As such, the ML-based components may be iteratively adjusted for each input training image of an epoch. Once an iteration epoch is complete, a subsequent iteration epoch may be carried out using the system as trained from the previous epoch as an initial starting point. Following in this manner, the unified representation learning system 100 may be trained to generate GFVs that can support the distinct tasks of image reconstruction and fingerprint generation and discrimination with a single, unified representation. Through training, the ML-based components may also learn to accurately carry out the diverse tasks of reconstructing images from GFVs, and generating and discriminating fingerprints. Advantageously, representation learning applied to diverse tasks may be unified in a single system and a single from of representational feature vector.

As discussed above, the query GFVs 111 used in training during any given iteration epoch may be generated prior the start of the given iteration epoch. In accordance with example embodiments, this may be done by applying an initialized version of the extraction module 102 to the set of input training images 101 prior to the start of the given iteration epoch to generate a corresponding set of initial-state GFVs that may be stored in a training database or recorded in memory for the duration of the given iteration epoch. The initialized version of the extraction module 102 may be a first initialized version if the given iteration epoch is the first epoch of a training run, or an intermediate initialized version based on training adjustments made during a previous iteration epoch if the given iteration epoch is not the first epoch of a training run. In practice, the previous iteration may be an immediately prior epoch, or one earlier that the immediately prior epoch.

A further advantage of example embodiments of unified representation learning systems is efficient updating and maintenance of forward and backward compatibility with system and component updates and revisions. In accordance with example embodiments, a trained system may be used, among other purposes, to create a database of reference GFVs for a variety of purposes. Such a database, which can grow over time, may also serve as a form of verified ground truths for future training of updated or revised ML-based modules in one or another version of an overall system. That is, in addition to training as described above, training may be adapted to ensure that GVFs generated by an updated or revised system closely match those in the reference database. In this way, any one or more ML-based components may be revised or updated while maintaining the integrity of the tasks and without requiring regeneration of the reference database.

For example, an updated or new client-side implementation may be developed and trained such that it produces results that are backwardly-compatible with existing systems and stored reference GFVs. This could accommodate new client devices and/or new client technologies. Similarly, updated fingerprint formats generated by updated fingerprint generation modules could also be supported by training an updated system using existing reference GFVs, and then generating new fingerprints with the trained, updated system. These are just two examples of the advantageous versatility of example embodiments of unified representation learning systems. Generally, this efficient model for training compatibility also enables versatility in implementation architectures and deployment scenarios, since a form of "mix and match" ML-based components and component technologies may be trained in a consistent manner. Some examples are described next.

B. Example Implementation Architecture and Deployment Example

Figure 4:
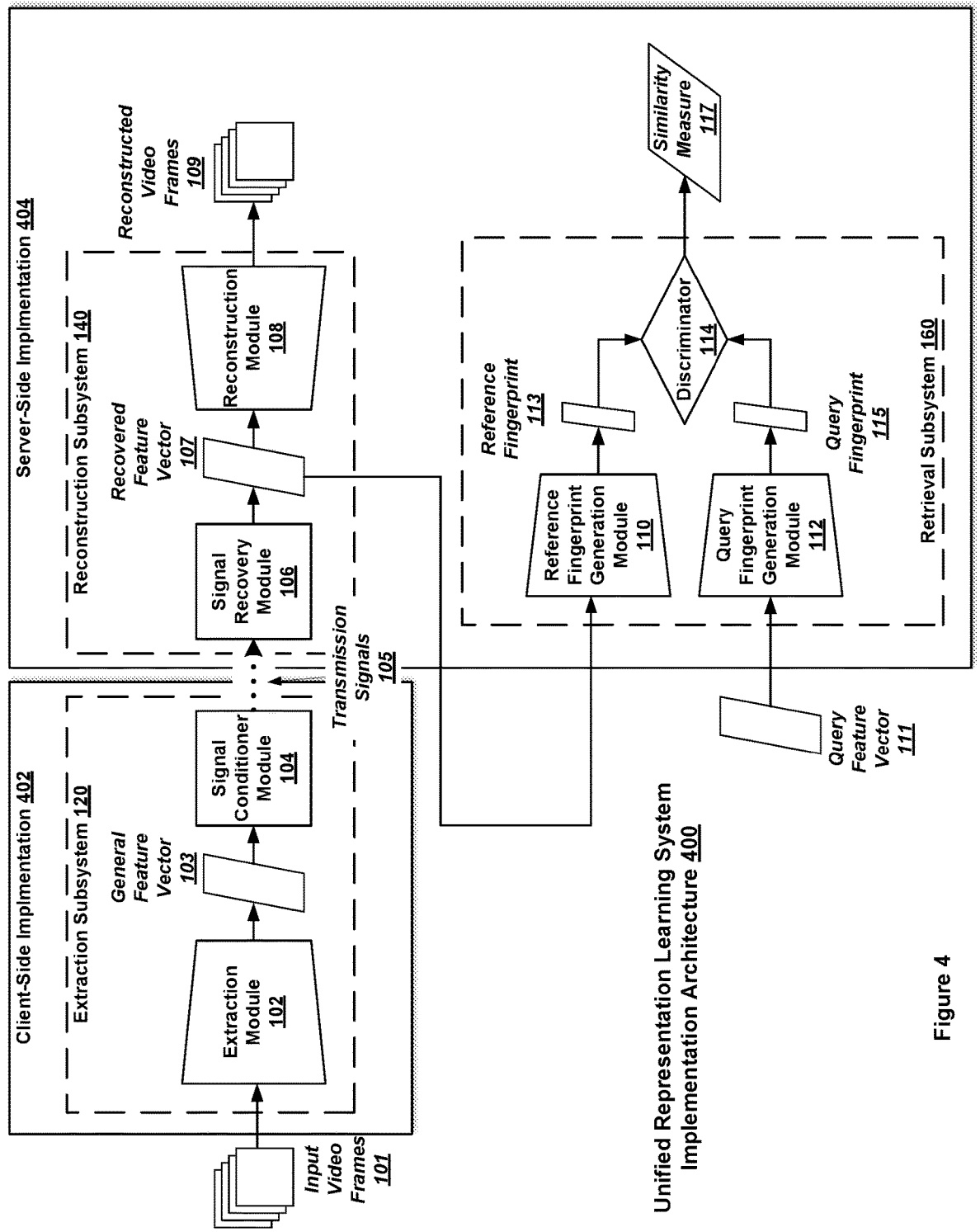
FIG. 4 illustrates an example architecture of a unified representation learning system, in accordance with example embodiments.

FIG. 4 illustrates an example implementation architecture 400 of a unified representation learning system, in accordance with example embodiments, and again in connection with the example of image and/or video data. As shown, the extraction subsystem 120 may be part of a client-side implementation 402, and the reconstruction and retrieval subsystems 140 and 160 may together be part of a server-side implementation 404. A communicative connection between the client-side implementation 402 and the server-side implementation 404 may carry the transmission signals 105 of the signal-conditioned GFV 103, as indicated.

In some example embodiments, the client-side implementation 402 may be configured in or as part of a client device, such as a smart TV or set top box. This arrangement may be used for audience viewing scenarios in which the a client-side application may report what media programming the client device is receiving and/or presenting by transmitting GFVs of some or all video frames back to the server-side implementation. (In example embodiments involving audio data, audience listening could be considered in place of or in addition to audience viewing.) As described above, the GVFs 103 may be signal-conditioned (e.g., compressed) into a binary bit stream for transmission over a wired and/or wireless connection to the server-side.

In other examples, the client-side implementation 402 may be configured in or as part of a server-based system or platform, such as a content-distribution network or broadcast network. This arrangement may be used documenting or archiving programming broadcasts and/or streams on a frame-by-frame basis, for example. In accordance with example embodiments, a content distribution service provider may direct a duplicate of a broadcast or stream to the client-side implementation, which then generates GFVs 103 and transmits them as signal-processed (e.g., compressed) bit streams to the server-side implementation. In this scenario, the communicative connection between the client side and the server side may be a direct link or even an internal application program interface between components or modules running on a common system platform.

In accordance with example embodiments, the server-side implementation 404 may be configured in or as part of a server platform in a content distribution service provider's network, which may in turn be implemented in centralized and/or distributed manner owned and/or managed for or by the service provider. The service provider's server platform may also be cloud-based, employing third-party real and/or virtual components. As described above, GFVs 103 received as transmitted signals from the client-side implementation 402 may be converted to recovered GFVs 107, which may then be used for image reconstruction and/or fingerprint generation and discrimination. A variety of applications may then be supported, some examples of which discussed in connection with deployment scenarios discussed below.

Figure 5:
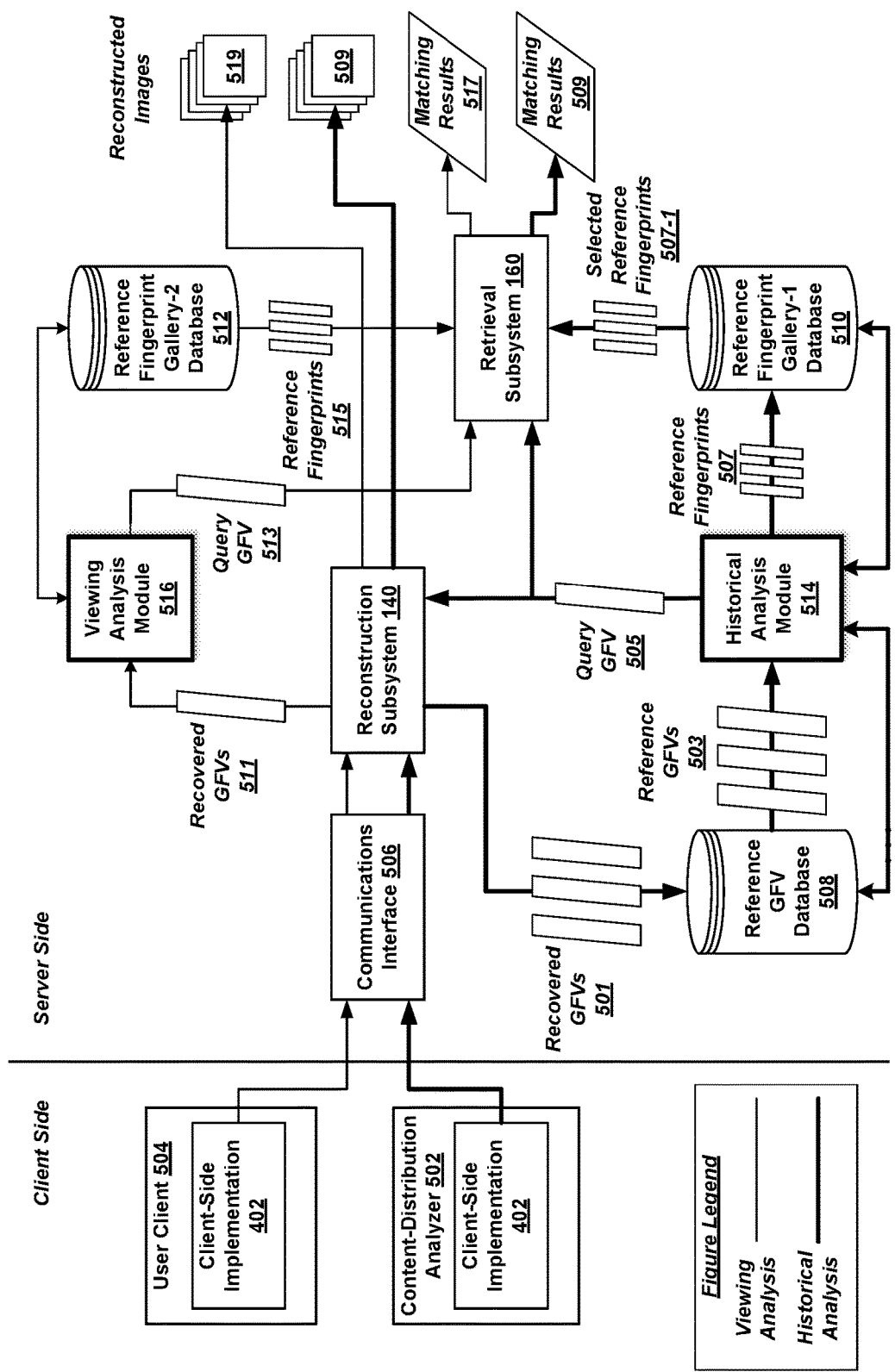
FIG. 5 illustrates an example deployment of a unified representation learning system, in accordance with example embodiments.

FIG. 5 depicts an example deployment 500 of a unified representation learning system, in accordance with example embodiments. In particular, the example deployment broadly illustrates two possible usage scenarios that may be supported by a unified representation learning system. One involves historical analysis of broadcasts and/or streaming of media content by a content broadcast and/or streaming entity (e.g., service provider), and the other involves audience viewing analysis of media content received by individual user client devices, such as smart TVs or set top boxes. These correspond to the two usage scenarios described above in connection with FIG. 4. Both scenarios are shown in FIG. 5, visually distinguished by two different styles of lines representing operational and informational flow. A figure legend indicates the two line styles. In practice, a unified representation learning system may be configured to support either or both of these scenarios, as well as others not explicitly described herein. As shown, a vertical line toward the left of the Figure demarcates the client side from the server side. Once again, for example embodiments involving audio data, audience listening analysis could be considered in place of or in addition to audience viewing analysis.

On the client side, the historical analysis usage scenario involves a client-side implementation 402 configured in a content-distribution analyzer 502, while the viewing analysis usage scenario involves a client-side implementation 402 configured in a user client 504. In line with the discussion of FIG. 4, the content-distribution analyzer 502 may be part of a server-based system or platform, such as a content-distribution network or broadcast network. Also following the discussion of FIG. 4, the user client 504 may be a smart TV or set top box, for example, though other forms or types of client devices are possible as well. Non-limiting examples include smart phones, personal digital devices, personal computers, and tablets.

The server-side deployment includes a reconstruction subsystem 140 and retrieval subsystem 160, a communications interface 506, a reference GFV database 508, a reference fingerprint gallery-1 database 510, and a reference fingerprint gallery-2 database 512. The two example usage scenarios are represented by a historical analysis module 514 and a viewing analysis module 516. Each of these may be considered to include user and/or programming interfaces facilitating user input for configuring and running specific applications that carry out the respective analyses, interacting and/or communicating with other system components in the process. In the server-side context, "users" may be operations personnel of a content distribution service provider, for example.

For purposes of illustration and by way of example, the server-side will be taken to be deployed by a content distribution service provider. For the usage scenario involving the content-distribution analyzer 502, the client-side will also be taken to be deployed by the content distribution service provider. This example arranging should not be viewed as limiting, and other arrangements are possible as well. For the usage scenario involving the user client 504, the client-side will also be taken to be deployed in a client device of an individual user or group of users (e.g., family residence, workplace, etc.).

The example usage scenario of historical analysis is described first.

In accordance with example embodiments, historical analysis may involve various phases of operation that could be carried out independently of one another. One phase may involve constructing the reference GFV database 508 by populating it with reference GFVs corresponding to video frames that are or have been broadcast or streamed by the content distribution service provider. As an example, the content distribution service provider might contract to receive media content from one or more content providers, such as movie/production companies, TV networks, and/or sporting event producers. The received content may then be bundled in various ways as offerings to end-user viewers on a subscription basis and/or on demand. The media content may be received on respective feeds from the content providers, then aggregated for broadcast and/or streaming to end users. The aggregated broadcasts or streams may be directed in duplicate to the content-distribution analyzer, where the client-side implementation 402 may generate GFVs 103 on a frame-by-frame basis and transmit them as signal-conditioned bit streams to the communications interface 506 on the server side, as indicated by the heavy black arrow. The GFV 103 transmissions may also include metadata descriptive of the media programming associated with each GFV 103, as well as specific to each individual frame corresponding to each individual GFV 103.

Continuing with construction of the reference GFV database 508, the communications interface 506 may provide the signal-conditioned bit stream to the reconstruction subsystem 140, which may generate recovered GFVs 501 and store them as reference GFVs in the reference GFV database 508. The reference GFVs may also be stored with the metadata received from the client side transmission. The process of constructing and populating the reference GFV database 508 may be carried out independently of subsequent analysis and/or processing operations. Further, the reference GFV database 508 may be used support a variety of analysis and/or processing operations besides the example historical analysis of the present discussion. In addition, the reference GFV database 508 may be periodically or continually updated or expanded as further broadcasts or streams are input on the client side.

In an example application of historical analysis, a program or user may input one or more queries by way of the historical analysis module 514. For example, query could pose a question of how many times in a 15-day period of specified dates a particular "query image" in a video frame has been broadcast or streamed. The query image may be supplied as an image and converted to a query GFV 505 by the historical analysis module 514. For example, the historical analysis module 514 may include a version of the extraction module 102.

The historical analysis module 514 may also access the reference GFV database 508 and retrieve all or some reference GFVs 503 having associated metadata that meets selection criteria specified by the 15-day search period. There could be other selection criteria as well, such as genre, title, or subject, to name a few. The historical analysis module 514 may then generate a set of reference fingerprints 507 from the reference GFVs 503, and store them the reference fingerprint gallery-1 510 for accelerated discrimination operations. For example, the historical analysis module 514 may also include a version of the reference fingerprint generation module 112. By creating a gallery of reference fingerprints, the reference fingerprint gallery-1 510 may also be used for subsequent queries that use the same search/selection criteria. By creating a gallery of reference fingerprints, without having to recreate the same reference fingerprints for each query. Further, multiple reference fingerprint galleries may be maintained at the same time (this represented by the presence of the reference fingerprint gallery-2 512, for example).

Historical analysis may then be carried out by inputting both selected reference fingerprints 507-1 from the reference fingerprint gallery-1 510 and the query GFV 505 to the retrieval subsystem 160, which may then perform fingerprint discrimination as described above. In this example, the retrieval subsystem may skip explicit generation of reference fingerprints 113 from reference GFVs 503, and instead receive prior generated reference fingerprints from the gallery-1 510. As noted, this may streamline multiple queries by avoiding the need to repeatedly generate reference fingerprint. The selected reference fingerprints 507-1 may correspond to further selection criteria applied to the gallery-1 510.

The retrieval subsystem 160 may then output matching results 509 corresponding to one or more queries. The matching results 509 may then be used for a variety of purposes relating to historical analysis. In addition to discrimination results, one or more query GFVs 505 may also be input to the reconstruction module 140, which may generated one or more corresponding reconstructed images 509. The reconstructed images may also be used for a variety of related and/or distinct purposes relating to historical analysis.

The example usage scenario of viewing analysis is described next.

In accordance with example embodiments, viewing analysis may also involve various phases of operation that could be carried out independently of one another. One phase may involve generation of a reference GFV database and a reference fingerprint gallery-2 512. This phase of operations may be largely the same as the corresponding phase of historical analysis, so a description of the details is not repeated in connection with viewing analysis. While not shown explicitly in FIG. 5, creating of the reference fingerprint gallery-2 512 may involve access to a reference GFV database for selection of reference GFVs. The reference GFV database could be the same as or different from the reference GFV database 508, and similarly for the gallery-2 512 fingerprints.

In an example application of viewing analysis, a user client 504 may receive and present broadcast or streaming media content, such as a sequence of video frames. The user client 504 may then direct a duplicate of the video frames presented to the client-side implementation 402, which in turn may generate GFVs 103 on a frame-by-frame basis and transmit them as signal-conditioned bit streams to the communications interface 506 on the server side, as indicated by the thin black arrow. The GFV 103 transmissions may also include metadata descriptive of the media programming associated with each GFV 103, as well as specific to each individual frame corresponding to each individual GFV 103.

The communications interface 506 may provide the signal-conditioned bit stream to the reconstruction subsystem 140, which may generate recovered GFVs 511 and input them to the viewing analysis module 516. In an example application of viewing analysis, a program or user may cause the viewing analysis module 516 to direct the recovered GFVs 511 to the retrieval subsystem 160 as query GFVs 513. The retrieval subsystem may then compare the query GFVs to reference GFVs retrieved in the form of corresponding reference fingerprints 515 from the reference fingerprint gallery-2 512. Again, a fingerprint gallery may be used to avoid the need to regenerate reference fingerprints for each query.

The retrieval subsystem 160 may then output matching results 519 corresponding to one or more queries. The matching results 519 may then be used for a variety of purposes relating to viewing analysis. In addition to discrimination results, one or more of the recovered GFVs 511 may be used by the reconstruction module 140 to generate one or more corresponding reconstructed images 519. The reconstructed images may also be used for a variety of related and/or distinct purposes relating to viewing analysis.

Another possible application involving audience viewing analysis and statistics may involve constructing one or more reference GVF databases from GFVs transmitted by user clients. In this example application, the detailed operations may be largely similar to those described in connection with the creation of the reference GFV database 508 from a content-distribution analyzer 502, except that the source of the transmitted GFVs is one or more end-user client devices. As such there could be many duplicates of GFVs to the extent that many end-user client devices may have received and/or presented the same broadcasts or streams. A possible reduction in storage requirements could be achieved by judicious down-sampling of received GFVs, for example. A reference GFV database recording the historical viewing of individual viewers (audience) could be applied in historical analyses similar to the one describe above.

The example scenarios of historical analysis and viewing analysis described above should not be viewed as limiting with respect to capabilities and applications of a unified representation learning system. Rather, they are meant to illustrate a sample of the types of operations that may involve or be carried out by the example deployment 500 shown by way of example in FIG. 5.

The illustrations of FIGS. 3, 4, and 5 are presented as examples involving image and/or video data, such as video frames. The figures and the systems and methods described could be extended or adapted to other types of media data, including audio data, such as 2D spectrograms and/or audio frames, for example.

C. Example Artificial Neural Network

As described above, a unified representation learning system may use one or more ANNs to perform such tasks as feature extraction, image reconstruction, fingerprint generation, and signal conditioning and recovery, for example. At runtime, the trained model may be applied to one or more video sequences, such as TV programs or movies, to carry out these tasks. In accordance with example embodiments, an ANN may be trained to extract features, generate GFVs, reconstruct images, and generate fingerprints from GFVs.

Figure 6:
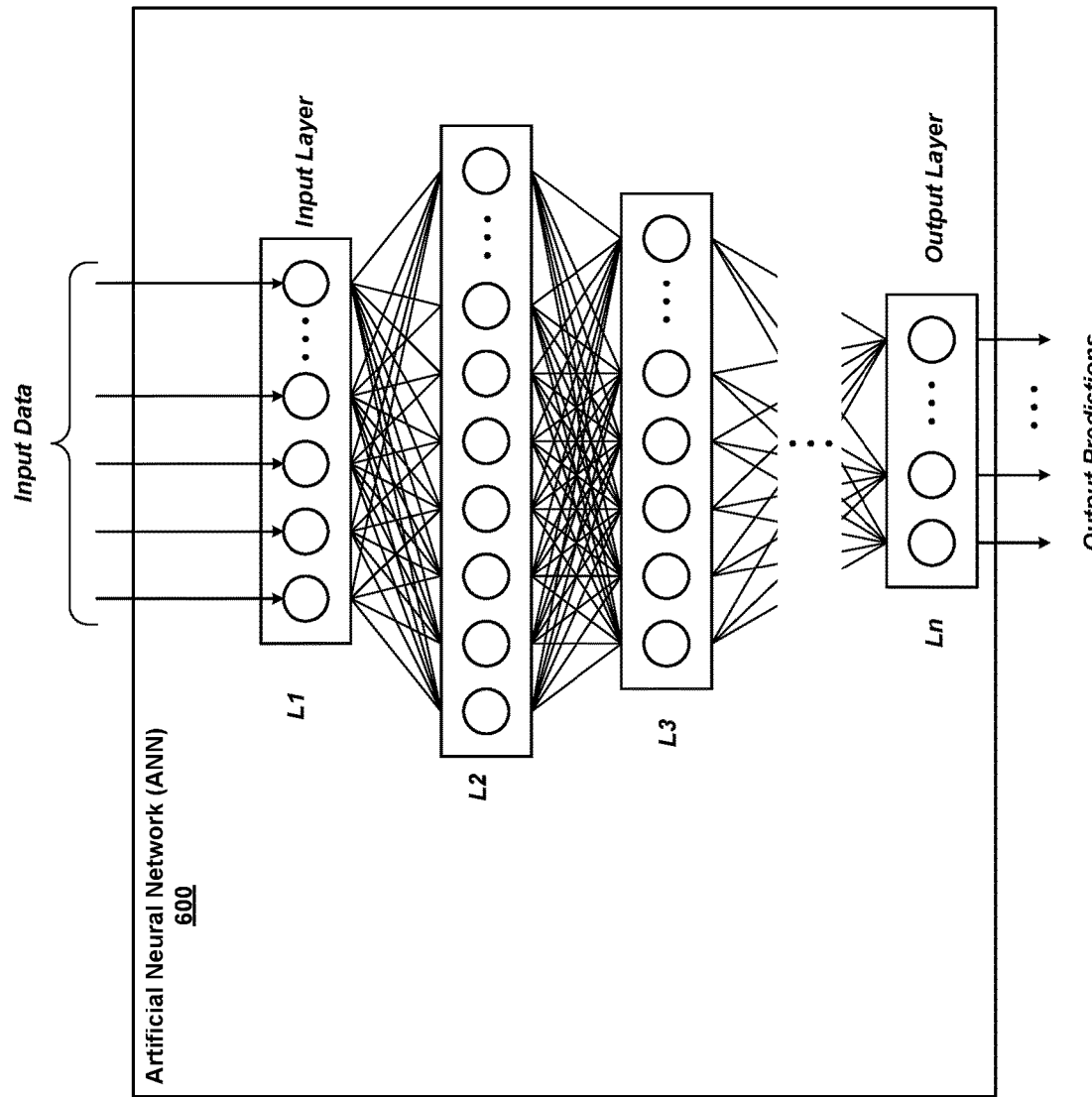
FIG. 6 is an example architecture of an example artificial neural network, in accordance with example embodiments.

FIG. 6 illustrates an example architecture of an example artificial neural network 600, in accordance with example embodiments. As shown, the ANN 600 may be computationally constructed as a plurality of interconnected layers, including an input layer, labeled "L1"; an output layer, labeled "Ln"; and one or more intermediate layers, labeled "L2" and "L3" in this example. The ellipses between L3 and Ln represent one or more possible intermediate layers. In this example, there are n layers, with Ln labeling the nth layer. Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for recognition of a particular class of content in a given type of data, such as cats or dogs in image data, for example, may involve inputting training data that represents known or ground-truth (training) examples of the particular class of content for which results are known, and then adjusting parameters (or weights) of the nodes in an ANN learning update procedure, such as back propagation, to maximize a probability that a predicted output by the ANN output (e.g., what the ANN "thinks" the input data represents) matches the training examples.

For some types of applications in which an ANN is used, it may be configured to predict a probability or probabilities that a given input matches one or more elements or classes of elements of a known discrete set of elements or classes of elements. In this context, the ANN or the system in which it is implemented may be referred to as a "classifier," signifying a classification operation. A classifier may also be configured to make an actual selection from among a known discrete set of elements or classes of elements. For other types of applications in which an ANN is used, it may be configured to compute, given an input, a probable continuous value (e.g., a scalar) or set of values (e.g., a vector) as output, possibly together with confidence levels for the predicted output(s). In this context, the ANN or the system in which it is implemented may be considered as performing one or another form of regression analysis. Example embodiments of ML predictors described herein may include or employ either or both types of ANN implementations, in accordance with the descriptions herein. Further, other types of ANNs are possible, and may be used or included in example embodiments of ML predictors described herein.

IV. Example Methods

Figure 7:
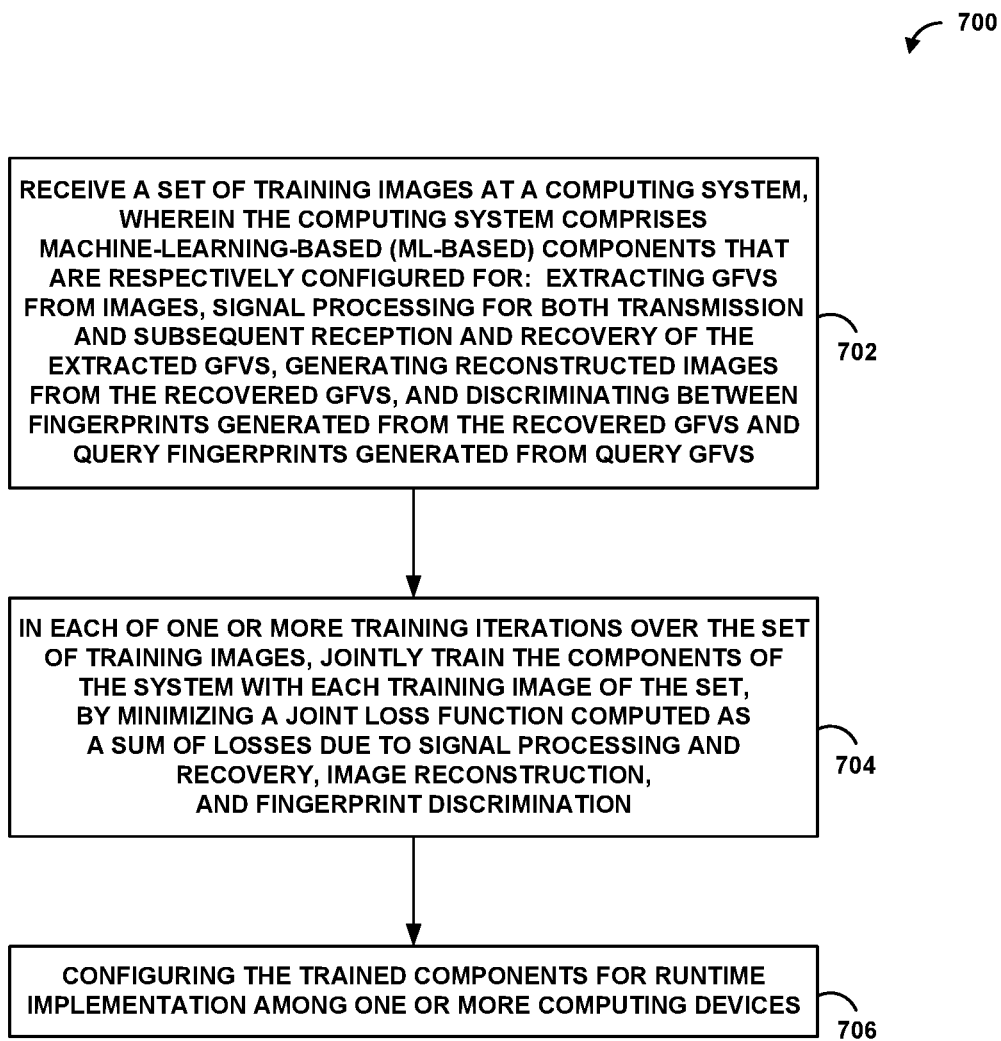
FIG. 7 is a flow chart of an example method of unified representation learning applied to image data, in accordance with example embodiments.
Figure 8:
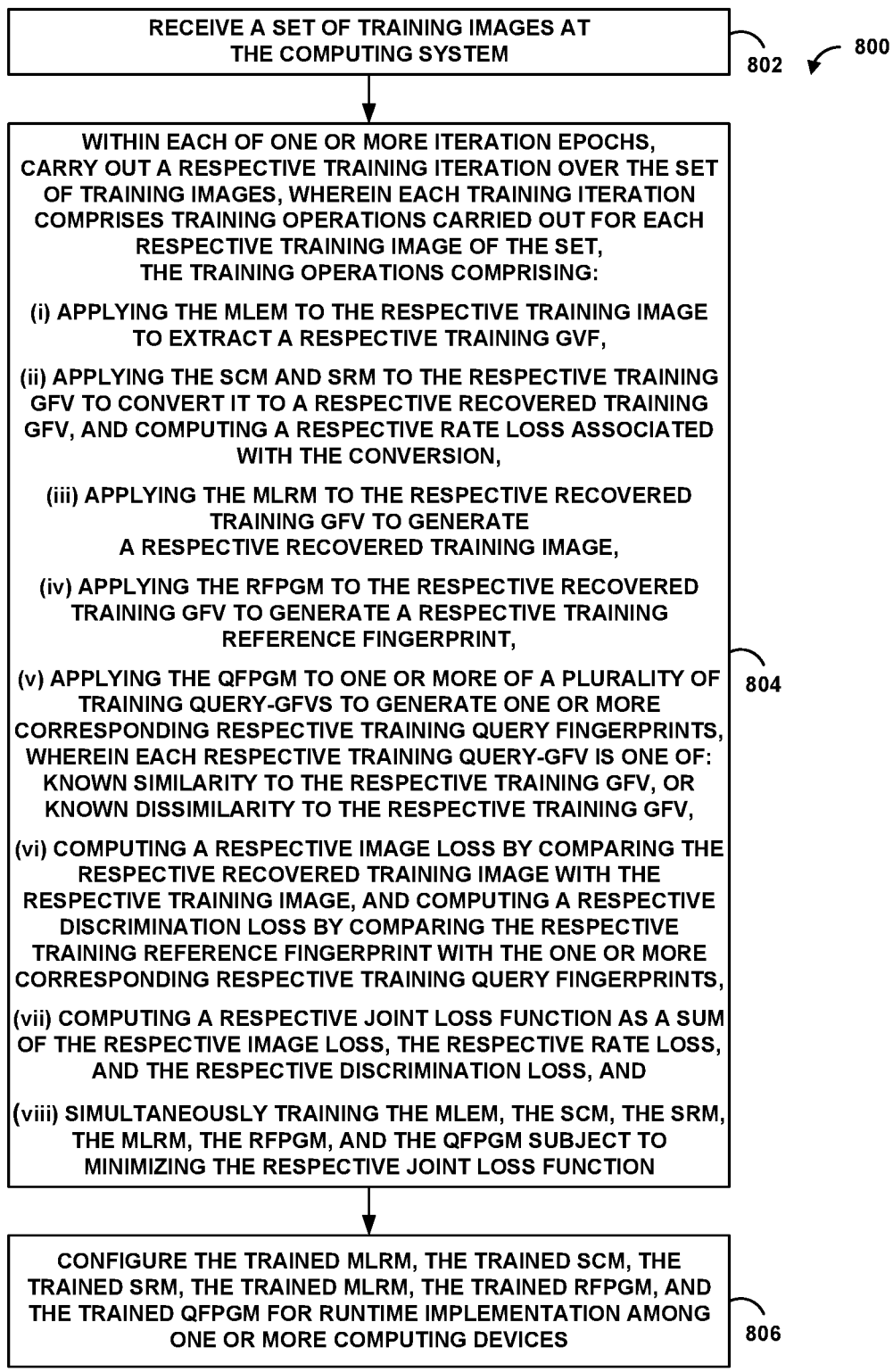
FIG. 8 is a flow chart of another example method of unified representation learning applied to image data, in accordance with example embodiments.
Figure 9:
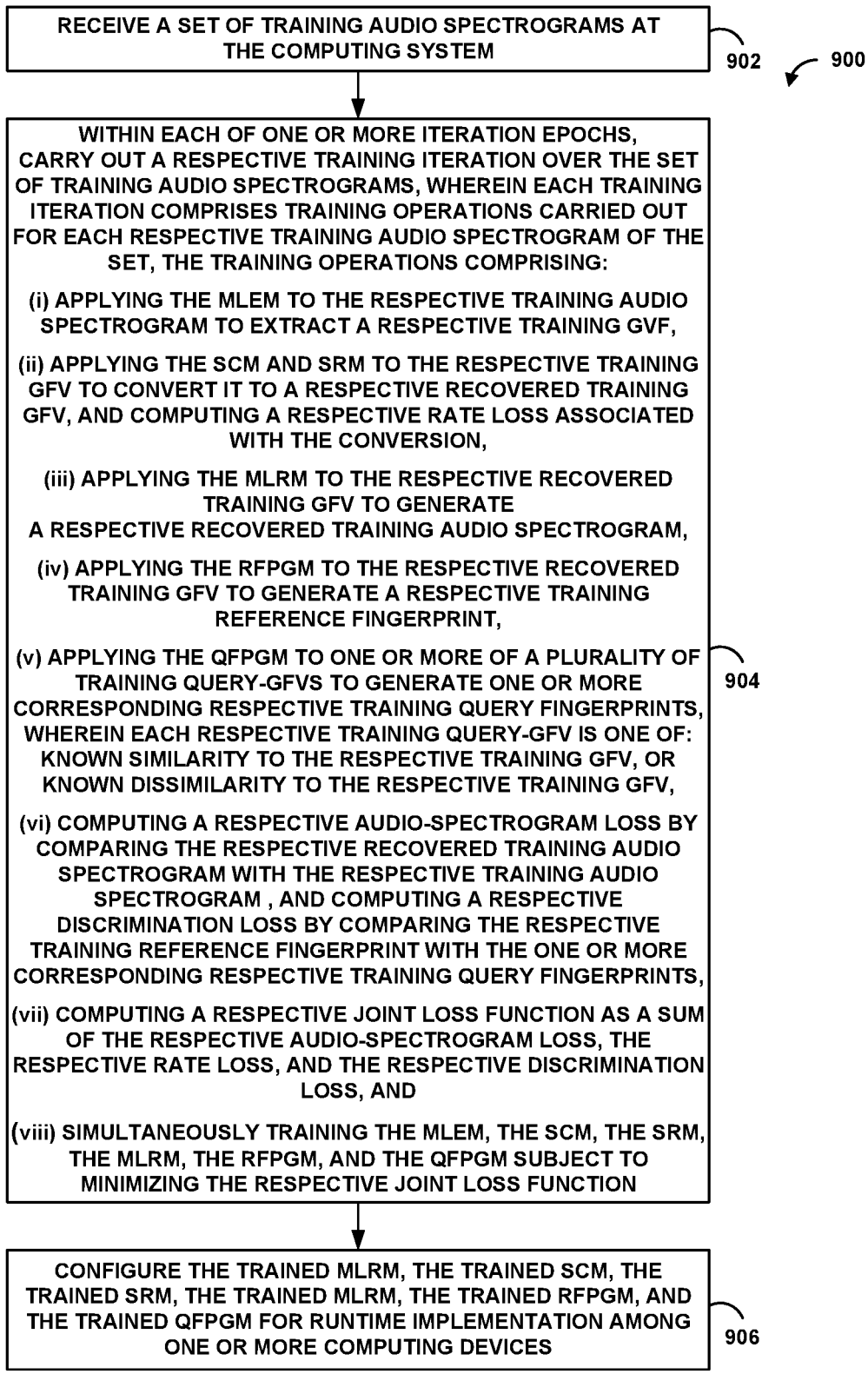
FIG. 9 is a flow chart of example method of unified representation learning applied to audio data, in accordance with example embodiments.

FIGS. 7 and 8 illustrate flow charts of example methods 700 and 800 for representation learning of image features that may be carried out by a unified representation learning system, such the unified representation learning system 100 shown in FIG. 1, 3, 4, or 5. FIG. 9 illustrates a flow chart of an example methods 900 for representation learning of audio features that may be carried out by a unified representation learning system for application to audio data. As discussed above, a unified representation learning system may be configured for operation in one or more computing systems, such as the computing system 200 shown by way of example in FIG. 2. In accordance with example embodiments, a unified representation learning system may be implemented in a single computing system or device, of in a distributed manner across multiple computing systems or devices.

The example methods 700, 800, and 900 may be implemented as computer-readable instructions stored in one or another form of memory (such as volatile or nonvolatile memory) of a computing device or system of the content-presentation device. When executed by one or more processors of the computing device or system, the instructions may cause the system or device or system to carry out operations of the example methods 700, 800, and/or 900. The computer-readable instructions may additionally be stored on a non-transitory computer readable medium, which may be used, for example, for loading the instructions into the memory of the computing system. In some examples, the non-transitory computer-readable medium could be the memory of the computing system.

Example method 700 is described first. In accordance with example embodiments, representation learning of image features may include generating general feature vectors (GFVs) that are each simultaneously constructed for separate tasks of both image reconstruction and fingerprint-based image discrimination.

Block 702 may involve receiving a set of training images at the computing system. The computing system may include various machine-learning-based (ML-based) components that are respectively configured for various functions and/or operations. These may include extracting GFVs from images, signal processing for both transmission and subsequent reception and recovery of the extracted GFVs, generating reconstructed images from the recovered GFVs, and discriminating between fingerprints generated from the recovered GFVs and query fingerprints generated from query GFVs.

Block 704 may involve, in each of one or more training iterations over the set of training images, jointly training the components of the system with each training image of the set. The joint training may entail minimizing a joint loss function computed as a sum of losses due to signal processing and recovery, image reconstruction, and fingerprint discrimination.

Finally, block 706 may involve configuring the trained components for runtime implementation among one or more computing devices. This may involve implementing the trained system in one or more computing devices in a centralized and/or distributed manner.

Example method 800 is described next. In accordance with example embodiments, an example computing system that carries out example method 800 may include computational implementations of a machine-learning-based (ML-based) extraction model (MLEM), a signal conditioner model (SCM), a signal recovery model (SRM), a ML-based reconstruction model (MLRM), a ML-based reference fingerprint generation model (RFPGM), and a ML-based query fingerprint generation model (QFPGM).

Block 802 may involve receiving a set of training images at the computing system.

Block 804 may involve one or more iteration epochs. More particularly, within each of one or more iteration epochs, a respective training iteration may be carried out over the set of training images. Each training iteration may entail training operations carried out for each respective training image of the set, the training operations. The operations may include: (i) applying the MLEM to the respective training image to extract a respective training general feature vector (GVF); (ii) applying the SCM followed in series by SRM to the respective training GFV to convert it to a respective recovered training GFV, and computing a respective rate loss associated with the conversion; (iii) applying the MLRM to the respective recovered training GFV to generate a respective recovered training image; (iv) applying the RFPGM to the respective recovered training GFV to generate a respective training reference fingerprint; and (v) applying the QFPGM to one or more of a plurality of training query-GFVs to generate one or more corresponding respective training query fingerprints. Each respective training query-GFV may be expected similarity to the respective training GFV, or expected dissimilarity to the respective training GFV. The operations may the further include: (vi) computing a respective image loss by comparing the respective recovered training image with the respective training image, and computing a respective discrimination loss by comparing the respective training reference fingerprint with the one or more corresponding respective training query fingerprints; (vii) computing a respective joint loss function as a sum of the respective image loss, the respective rate loss, and the respective discrimination loss; and (viii) simultaneously training the MLEM, the SCM, the SRM, the MLRM, the RFPGM, and the QFPGM subject to minimizing the respective joint loss function.

Finally, block 806 may involve configuring the trained MLRM, the trained SCM, the trained SRM, the trained MLRM, the trained RFPGM, and the trained QFPGM for runtime implementation among one or more computing devices. This may involve implementing the trained system in one or more computing devices in a centralized and/or distributed manner.

In accordance with example embodiments, the trained MLMR and the trained SCM may be implemented on a client-side computing system, and the trained SRM, the trained MLRM, the trained RFPGM, and the trained QFPGM may be implemented on a server-side computing system. With this arrangement, the method 800 may further involve receiving one or more video streams at the client-side computing system, where each video stream may include associated metadata and a sequence of video frames. The client-side computing system may generate respective runtime GFVs from the video frames of the one or more video streams with the trained MLMR, and generate respective GFV signals from the respective runtime GFVs with the trained SCM. The client-side computing system may then transmit the respective GFV signals and associated metadata to the server-side computing system.

In accordance with example embodiments, the trained MLMR and the trained SCM may again be implemented on a client-side computing system, and the trained SRM, the trained MLRM, the trained RFPGM, and the trained QFPGM may again be implemented on a server-side computing system. With this same arrangement, the method 800 may further involve receiving at the server-side computing system a sequence of respective GFV signals and metadata from the client-side computing system. The respective GVF signals may correspond to respective video frames of a video stream. In particular, the respective video frames may have been processed into respective runtime GFVs by the trained MLMR, and the respective runtime GFVs may have been processed into the respective GFV signals by the trained SCM. Further, the metadata may be associated with at least one of the video stream or the respective video frames. Then, the server-side computing system may generate respective recovered runtime GFVs from the received respective GFV signals with the trained SRM, and may store the respective recovered runtime GFVs and received metadata in a reference GFV database of reference GFVs. After storing, the reference GFV database may contain at least the respective recovered runtime GFVs and received metadata.

In accordance with example embodiments, the example method 800 may further entail receiving a runtime query GFV at the server-side computing system. The runtime query GFV may correspond to a query image and query criteria. The server-side computing system may then select a subset of reference GFVs from the reference GFV database based on the query criteria applied to reference metadata in the reference GFV database, and may apply the trained QFPGM to the runtime query GFV to generate a runtime query fingerprint. The server-side computing system may apply the trained RFPGM to the subset of reference GFVs to generate one or more runtime reference fingerprints. Runtime reference fingerprints that match the runtime query fingerprint to within at least a threshold matching condition may then be identified.

In accordance with example embodiments, the example method 800 may further entail receiving from a query source one or more runtime query GFVs at the server-side computing system, where the runtime query GFVs correspond to one or more query images. The trained MLRM may be applied to the one or more runtime query GFVs to generate one or more a runtime recovered images, where the query source may be the client-side computing system and/or the reference GFV database.

In accordance with example embodiments, each of the MLEM, MLRM, RFPGM, and QFPGM may be or include an artificial neural network (ANN), and each of the SCM and SRM may be or include a ML-based model. In this arrangement simultaneously training the MLRM, the SCM, the SRM, the MLRM, the RFPGM, and the QFPGM subject to minimizing the respective joint loss function may involve, for each respective training image of the set, applying a learning-update procedure simultaneously to each of the MLRM, the SCM, the SRM, the MLRM, the RFPGM, and the QFPGM, subject to minimization of the respective joint loss function.

In further accordance with example embodiments, the SCM may be based on a data compression algorithm that is a lossy compression algorithm or a lossless compression algorithm. The SRM may further be or include a data decompression algorithm that is complementary to the data compression algorithm.

In accordance with example embodiments, computing the respective discrimination loss by comparing the respective training reference fingerprint with the one or more corresponding respective training query fingerprints may entail computing a loss function that increases as a function of increasing errant similarity and/or increasing errant dissimilarity. In particular, for a given fingerprint generated from a given GFV the errant similarity may increase with increasing quantitative similarity of the given fingerprint to given query fingerprints generated from given query-GFVs known to be increasingly dissimilar to the given GFV. Conversely, the errant dissimilarity may increase with increasing quantitative dissimilarity of the given fingerprint to given query fingerprints generated from given query-GFVs known to be increasingly similar to the given GFV.

In accordance with example embodiments, the example method 800 may further entail initializing parameter values of each of the MLEM, the SCM, the SRM, the MLRM, the RFPGM, and the QFPGM for each given iteration epoch of the one or more iteration epochs. Initialization may involve setting initial respective parameter values, or intermediate respective parameter values determined by training during a previous iteration epoch. In addition, the plurality of training query-GFVs may also be initialized for each given iteration epoch of the one or more iteration epochs. Initializing the plurality of training query-GFVs may involve initializing the plurality to an initial plurality of training query-GFVs, or an intermediate plurality of training query-GFVs generated by the MLEM as trained during the previous iteration epoch.

In accordance with example embodiments, example method 800 may further involve making updates subsequent to storing the respective recovered runtime GFVs and received metadata in a reference GFV database of reference GFVs. This may involve updating the trained MLEM, the trained SCM, the trained SRM, the trained MLRM, the trained RFPGM, or the trained QFPGM. The example method may then involve generating updated reference GFVs that are identical to at least a subset of the reference GFVs in the reference GFV database to within a specified tolerance threshold. This may entail jointly retraining the updated MLEM, the updated SCM, the updated SRM, the updated MLRM, the updated RFPGM, and/or the updated QFPGM.

Example method 900 is largely the same as example method 800, except that the input data may be audio data, such as 2D audio spectrograms and/or audio frames. As with the example method 800, an example computing system that carries out example method 900 may include computational implementations of a machine-learning-based (ML-based) extraction model (MLEM), a signal conditioner model (SCM), a signal recovery model (SRM), a ML-based reconstruction model (MLRM), a ML-based reference fingerprint generation model (RFPGM), and a ML-based query fingerprint generation model (QFPGM).

The description of blocks 902-906 of example method 900 largely repeat the description of blocks 802-806, except that audio spectrograms are considered in place of image data and/or video frames. For the sake of brevity, detailed discussion of blocks 902-906 is omitted. However, it may be seen that the description of blocks 802-806 may be straightforwardly extended and/or adapted to a description of blocks 902-906 as applied to audio data.

V. Example Variations

Although the examples and features described above have been described in connection with specific entities and specific operations, in practice, there are likely to be many instances of these entities and many instances of these operations being performed, perhaps contemporaneously or simultaneously, on a large scale.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for representation learning of image features carried out by a computing system comprising computational implementations of a machine-learning-based (ML-based) extraction model (MLEM), a signal conditioner model (SCM), a signal recovery model (SRM), a ML-based reconstruction model (MLRM), a ML-based reference fingerprint generation model (RFPGM), and a ML-based query fingerprint generation model (QFPGM), the method comprising:

receiving a set of training images at the computing system;

within each of one or more iteration epochs, carrying out a respective training iteration over the set of training images, wherein each training iteration comprises training operations carried out for each respective training image of the set, the training operations comprising:

(i) applying the MLEM to the respective training image to extract a respective training general feature vector (GVF), (ii) applying the SCM followed in series by the SRM to the respective training GFV to convert it to a respective recovered training GFV, and computing a respective rate loss associated with the conversion, (iii) applying the MLRM to the respective recovered training GFV to generate a respective recovered training image, (iv) applying the RFPGM to the respective recovered training GFV to generate a respective training reference fingerprint, (v) applying the QFPGM to one or more of a plurality of training query-GFVs to generate one or more corresponding respective training query fingerprints, wherein each respective training query-GFV is one of: expected similarity to the respective training GFV, or expected dissimilarity to the respective training GFV, (vi) computing a respective image loss by comparing the respective recovered training image with the respective training image, and computing a respective discrimination loss by comparing the respective training reference fingerprint with the one or more corresponding respective training query fingerprints, (vii) computing a respective joint loss function as a sum of the respective image loss, the respective rate loss, and the respective discrimination loss, and (viii) simultaneously training the MLEM, the SCM, the SRM, the MLRM, the RFPGM, and the QFPGM subject to minimizing the respective joint loss function; and configuring the trained MLRM, the trained SCM, the trained SRM, the trained MLRM, the trained RFPGM, and the trained QFPGM for runtime implementation among one or more computing devices.

2. The method of claim 1, wherein the trained MLMR and the trained SCM are implemented on a client-side computing system, wherein the trained SRM, the trained MLRM, the trained RFPGM, and the trained QFPGM are implemented on a server-side computing system, and wherein the method further comprises:

at the client-side computing system, receiving one or more video streams, each video stream comprising associated metadata and a sequence of video frames;

at the client-side computing system, generating respective runtime GFVs from the video frames of the one or more video streams with the trained MLMR, and generating respective GFV signals from the respective runtime GFVs with the trained SCM; and transmitting the respective GFV signals and associated metadata to the server-side computing system.

3. The method of claim 1, wherein the trained MLMR and the trained SCM are implemented on a client-side computing system, wherein the trained SRM, the trained MLRM, the trained RFPGM, and the trained QFPGM are implemented on a server-side computing system, and wherein the method further comprises:

at the server-side computing system, receiving, from the client-side computing system, a sequence of respective GFV signals and metadata, the respective GVF signals corresponding to respective video frames of a video stream, wherein the respective video frames have been processed into respective runtime GFVs by the trained MLMR, and the respective runtime GFVs have been processed into the respective GFV signals by the trained SCM, and wherein the metadata is associated with at least one of the video stream or the respective video frames;

at the server-side computing system, generating respective recovered runtime GFVs from the received respective GFV signals with the trained SRM; and storing the respective recovered runtime GFVs and received metadata in a reference GFV database of reference GFVs, wherein after storing, the reference GFV database contains at least the respective recovered runtime GFVs and received metadata.

4. The method of claim 3, further comprising:

at the server-side computing system, receiving a runtime query GFV corresponding to a query image and query criteria;

selecting a subset of reference GFVs from the reference GFV database based on the query criteria applied to reference metadata in the reference GFV database;

applying the trained QFPGM to the runtime query GFV to generate a runtime query fingerprint;

applying the trained RFPGM to the subset of reference GFVs to generate one or more runtime reference fingerprints; and identifying any of the one or more runtime reference fingerprints that match the runtime query fingerprint to within at least a threshold matching condition.

5. The method of claim 3, further comprising:

at the server-side computing system, receiving from a query source one or more runtime query GFVs corresponding to one or more query images; and applying the trained MLRM to the one or more runtime query GFVs to generate one or more a runtime recovered images, wherein the query source is at least one of the client-side computing system or the reference GFV database.

6. The method of claim 3, further comprising:

subsequent to storing the respective recovered runtime GFVs and received metadata in a reference GFV database of reference GFVs, updating at least one of: the trained MLEM, the trained SCM, the trained SRM, the trained MLRM, the trained RFPGM, or the trained QFPGM; and generating updated reference GFVs that are identical to at least a subset of the reference GFVs in the reference GFV database to within a specified tolerance threshold, by jointly retraining the at least one of: the updated MLEM, the updated SCM, the updated SRM, the updated MLRM, the updated RFPGM, or the updated QFPGM.

7. The method of claim 1, wherein each of the MLEM, MLRM, RFPGM, and QFPGM comprises an artificial neural network (ANN), wherein each of the SCM and SRM comprises a ML-based model, and wherein simultaneously training the MLRM, the SCM, the SRM, the MLRM, the RFPGM, and the QFPGM subject to minimizing the respective joint loss function comprises:

for each respective training image of the set, applying a learning-update procedure simultaneously to each of the MLRM, the SCM, the SRM, the MLRM, the RFPGM, and the QFPGM, subject to minimization of the respective joint loss function.

8. The method of claim 7, wherein the SCM further comprises a data compression algorithm that is one of: a lossy compression algorithm, or a lossless compression algorithm, and wherein the SRM further comprises a data decompression algorithm that is complementary to the data compression algorithm.

9. The method of claim 1, wherein computing the respective discrimination loss by comparing the respective training reference fingerprint with the one or more corresponding respective training query fingerprints comprises:

computing a loss function that increases as a function of at least one of: increasing errant similarity, or increasing errant dissimilarity, and wherein, for a given fingerprint generated from a given GFV:

the errant similarity increases with increasing quantitative similarity of the given fingerprint to given query fingerprints generated from given query-GFVs known to be increasingly dissimilar to the given GFV, and the errant dissimilarity increases with increasing quantitative dissimilarity of the given fingerprint to given query fingerprints generated from given query-GFVs known to be increasingly similar to the given GFV.

10. The method of claim 1, further comprising:

for each given iteration epoch of the one or more iteration epochs, initializing parameter values of each of the MLEM, the SCM, the SRM, the MLRM, the RFPGM, and the QFPGM with one of: initial respective parameter values, or intermediate respective parameter values determined by training during a previous iteration epoch; and for each given iteration epoch of the one or more iteration epochs, initializing the plurality of training query-GFVs to one of: an initial plurality of training query-GFVs, or an intermediate plurality of training query-GFVs generated by the MLEM as trained during the previous iteration epoch.

11. A method for generating general feature vectors (GFVs) that are each simultaneously constructed for separate tasks of both image reconstruction and fingerprint-based image discrimination, the method being implemented by a computing system and comprising:

receiving a set of training images at the computing system, wherein the computing system comprises machine-learning-based (ML-based) components that are respectively configured for: extracting GFVs from images, signal processing for both transmission and subsequent reception and recovery of the extracted GFVs, generating reconstructed images from the recovered GFVs, and discriminating between fingerprints generated from the recovered GFVs and query fingerprints generated from query GFVs;

in each of one or more training iterations over the set of training images, jointly training the components of the system with each training image of the set, by minimizing a joint loss function computed as a sum of losses due to signal processing and recovery, image reconstruction, and fingerprint discrimination; and configuring the trained components for runtime implementation among one or more computing devices.

12. A system for representation learning of image features carried out by a computing system comprising, the system comprising:

one or more processors; and memory storing instructions that, when executed by the one or more processors, cause the system to carry out operations including:

implementing a machine-learning (ML)-based extraction model (MLEM), a signal conditioner model (SCM), a signal recovery model (SRM), a ML-based reconstruction model (MLRM), a ML-based reference fingerprint generation model (RFPGM), and a ML-based query fingerprint generation model (QFPGM);

receiving a set of training images at the computing system;

within each of one or more iteration epochs, carrying out a respective training iteration over the set of training images, wherein each training iteration comprises training operations carried out for each respective training image of the set, the training operations comprising:

(i) applying the MLEM to the respective training image to extract a respective training general feature vector (GVF), (ii) applying the SCM followed in series by the SRM to the respective training GFV to convert it to a respective recovered training GFV, and computing a respective rate loss associated with the conversion, (iii) applying the MLRM to the respective recovered training GFV to generate a respective recovered training image, (iv) applying the RFPGM to the respective recovered training GFV to generate a respective training reference fingerprint, (v) applying the QFPGM to one or more of a plurality of training query-GFVs to generate one or more corresponding respective training query fingerprints, wherein each respective training query-GFV is one of: expected similarity to the respective training GFV, or expected dissimilarity to the respective training GFV, (vi) computing a respective image loss by comparing the respective recovered training image with the respective training image, and computing a respective discrimination loss by comparing the respective training reference fingerprint with the one or more corresponding respective training query fingerprints, (vii) computing a respective joint loss function as a sum of the respective image loss, the respective rate loss, and the respective discrimination loss, and (viii) simultaneously training the MLEM, the SCM, the SRM, the MLRM, the RFPGM, and the QFPGM subject to the respective joint loss function; and configuring at least one of the trained MLRM, the trained SCM, the trained SRM, the trained MLRM, the trained RFPGM, or the trained QFPGM for runtime implementation on one or more computing devices.

13. The system of claim 12, wherein the trained MLMR and the trained SCM are implemented on a client-side computing system, wherein the trained SRM, the trained MLRM, the trained RFPGM, and the trained QFPGM are implemented on a server-side computing system, and wherein the operations further include:

at the client-side computing system, receiving one or more video streams, each video stream comprising associated metadata and a sequence of video frames;

at the client-side computing system, generating respective runtime GFVs from the video frames of the one or more video streams with the trained MLMR, and generating respective GFV signals from the respective runtime GFVs with the trained SCM; and transmitting the respective GFV signals and associated metadata to the server-side computing system.

14. The system of claim 12, wherein the trained MLMR and the trained SCM are implemented on a client-side computing system, wherein the trained SRM, the trained MLRM, the trained RFPGM, and the trained QFPGM are implemented on a server-side computing system, and wherein the operations further include:

at the server-side computing system, receiving, from the client-side computing system, a sequence of respective GFV signals and metadata, the respective GVF signals corresponding to respective video frames of a video stream, wherein the respective video frames have been processed into respective runtime GFVs by the trained MLMR, and the respective runtime GFVs have been processed into the respective GFV signals by the trained SCM, and wherein the metadata is associated with at least one of the video stream or the respective video frames;

at the server-side computing system, generating respective recovered runtime GFVs from the received respective GFV signals with the trained SRM; and storing the respective recovered runtime GFVs and received metadata in a reference GFV database of reference GFVs, wherein after storing, the reference GFV database contains at least the respective recovered runtime GFVs and received metadata.

15. The system of claim 14, wherein the operations further include:

at the server-side computing system, receiving a runtime query GFV corresponding to a query image and query criteria;

selecting a subset of reference GFVs from the reference GFV database based on the query criteria applied to reference metadata in the reference GFV database;

applying the trained QFPGM to the runtime query GFV to generate a runtime query fingerprint;

applying the trained RFPGM to the subset of reference GFVs to generate one or more runtime reference fingerprints; and identifying any of the one or more runtime reference fingerprints that match the runtime query fingerprint to at least a threshold matching condition.

16. The system of claim 14, wherein the operations further include:

at the server-side computing system, receiving from a query source one or more runtime query GFVs corresponding to one or more query images; and applying the trained MLRM to the one or more runtime query GFVs to generate one or more a runtime recovered images, wherein the query source is at least one of the client-side computing system or the reference GFV database.

17. The system of claim 14, wherein the operations further include:

subsequent to storing the respective recovered runtime GFVs and received metadata in a reference GFV database of reference GFVs, updating at least one of: the trained MLEM, the trained SCM, the trained SRM, the trained MLRM, the trained RFPGM, or the trained QFPGM; and generating updated reference GFVs that are identical to at least a subset of the reference GFVs in the reference GFV database to within a specified tolerance threshold, by jointly retraining the at least one of: the updated MLEM, the updated SCM, the updated SRM, the updated MLRM, the updated RFPGM, or the updated QFPGM.

18. The system of claim 12, wherein each of the MLEM, MLRM, RFPGM, and QFPGM comprises an artificial neural network (ANN), wherein the SCM comprises a ML-based model for data compression, the data compression being one of: a lossy compression algorithm, or a lossless compression algorithm, wherein the SRM comprises a ML-based model for data decompression, the data decompression being complementary to the data compression, and wherein simultaneously training the MLRM, the SCM, the SRM, the MLRM, the RFPGM, and the QFPGM subject to minimizing the respective joint loss function comprises:

for each respective training image of the set, applying a learning-update procedure simultaneously to each of the MLRM, the SCM, the SRM, the MLRM, the RFPGM, and the QFPGM, subject to minimization of the respective joint loss function.

19. The system of claim 12, wherein computing the respective discrimination loss by comparing the respective training reference fingerprint with the one or more corresponding respective training query fingerprints comprises:

computing a loss function that increases as a function of at least one of: increasing errant similarity, or increasing errant dissimilarity, and wherein, for a given fingerprint generated from a given GFV:

the errant similarity increases with increasing quantitative similarity of the given fingerprint to given query fingerprints generated from given query-GFVs known to be increasingly dissimilar to the given GFV, and the errant dissimilarity increases with increasing quantitative dissimilarity of the given fingerprint to given query fingerprints generated from given query-GFVs known to be increasingly similar to the given GFV.

20. The system of claim 12, wherein the operations further include:

for each given iteration epoch of the one or more iteration epochs, initializing parameter values of each of the MLEM, the SCM, the SRM, the MLRM, the RFPGM, and the QFPGM with one of: initial respective parameter values, or intermediate respective parameter values determined by training during a previous iteration epoch; and for each given iteration epoch of the one or more iteration epochs, initializing the plurality of training query-GFVs to one of: an initial plurality of training query-GFVs, or an intermediate plurality of training query-GFVs generated by the MLEM as trained during the previous iteration epoch.

\* \* \* \* \*